US008862502B2

(12) United States Patent
Takano et al.

(10) Patent No.: US 8,862,502 B2
(45) Date of Patent: Oct. 14, 2014

(54) INFORMATION PROVIDING METHOD AND ADVERTISEMENT PROVIDING METHOD

(75) Inventors: Hideki Takano, Kawasaki (JP); Ryoichi Ueda, Yokohama (JP); Go Kojima, Yamato (JP)

(73) Assignee: Hitachi, Ltd., Tokyo (JP)

( * ) Notice: Subject to any disclaimer, the term of this patent is extended or adjusted under 35 U.S.C. 154(b) by 1185 days.

(21) Appl. No.: 12/675,045

(22) PCT Filed: Oct. 17, 2008

(86) PCT No.: PCT/JP2008/068855
§ 371 (c)(1),
(2), (4) Date: Jan. 11, 2011

(87) PCT Pub. No.: WO2009/051225
PCT Pub. Date: Apr. 23, 2009

(65) Prior Publication Data
US 2011/0099068 A1    Apr. 28, 2011

(30) Foreign Application Priority Data
Oct. 18, 2007    (JP) .................................. 2007-270896

(51) Int. Cl.
*G06Q 30/00*    (2012.01)
*G06Q 30/02*    (2012.01)
(52) U.S. Cl.
CPC ............ *G06Q 30/02* (2013.01); *G06Q 30/0273* (2013.01); *G06Q 30/0272* (2013.01); *G06Q 30/0256* (2013.01)
USPC ........................ 705/14.69; 705/14.4; 709/218
(58) Field of Classification Search
None
See application file for complete search history.

(56) References Cited

U.S. PATENT DOCUMENTS

2008/0294716 A1 *  11/2008  Couvreur ...................... 709/203

FOREIGN PATENT DOCUMENTS

| JP | 2001-352403 | 12/2001 |
| JP | 2003-295966 | 10/2003 |
| JP | 2003-323571 | 11/2003 |
| JP | 2005-128919 | 5/2005 |
| JP | 2007-010887 | 1/2007 |

(Continued)

OTHER PUBLICATIONS

Hiroshi Yuki, :Feature 1 part2, Basics of API Programming; From the Method for Accessing Web API to Mashup, Nikkei Sofware, Mar. 24, 2007, pp. 36-47, vol. 10, No. 5.

(Continued)

*Primary Examiner* — John G Weiss
*Assistant Examiner* — Christopher Stroud
(74) *Attorney, Agent, or Firm* — Antonelli, Terry, Stout & Kraus, LLP.

(57) ABSTRACT

This object is aimed to provide an advertisement providing system, etc. that defines a web API that contributes to the creation of an advertisement attached webpage for making it possible to distribute referral fees of the advertisement. A system carries out processing while taking a session ID generated by an advertisement intermediary service (105) among a website (103), a web API (104) and the advertisement intermediary service (105), wherein the website (103) creates a webpage including a result of processing by the web API (104), a link for acquiring a resource of advertisement information, and a link having as a parameter a session ID which is called on selection of an advertisement. And returns the webpage to a web browser (102), and the advertisement intermediary service (105) records an advertisement information request in association with the session ID when the web browser (102) requests the advertisement intermediary service (105) for an advertisement information resource and then returns the advertisement information resource to the web browser (102), thereby attaining the object.

6 Claims, 20 Drawing Sheets

(56) References Cited

FOREIGN PATENT DOCUMENTS

| JP | 2007-018200 | 1/2007 |
|----|-------------|--------|
| JP | 2007-025779 | 2/2007 |
| JP | 2007-141171 | 6/2007 |
| JP | 2007-179319 | 7/2007 |

OTHER PUBLICATIONS

Hiroshi Yuki, "Learning Web Technique 2006 Through Easy Implementation, Part 2, Web API for Authenticating Hatena API Authentication User", Nikkei Software, Jul. 24, 2006, pp. 128-139, Vo. 9, No. 9.

Hiroyuki Morikawa "Revolution to Carrier Network—All About Ngn, Part1, Outline of NGN, Adding Functions to the Internet, Changing Industrial Structure via Opening", Nikkei Communications, Oct. 1, 2006, pp. 106-111, No. 471.

Google AdSense; https://www.google.com/adsense/login/ja/index.html.

* cited by examiner

FIG. 18

LOGS ON WEBSITE (INTRODUCER IDENTIFICATION INFORMATION: Web_site_9999) — 1801

| SESSION ID | TIME OF CALL | CALLING INTRODUCER IDENTIFICATION INFORMATION | CALLED INTRODUCER IDENTIFICATION INFORMATION |
| --- | --- | --- | --- |
| 123456789abcdef | 2008/08/11 07:25:11:258 | web_site_9999 | web_api_1111 |
| 123456789abcdef | 2008/08/11 07:25:11:585 | web_site_9999 | web_api_3333 |
| 234567891bcdefa | 2008/08/11 07:28:56:778 | web_site_9999 | web_api_2222 |
| ... | | | |

LOGS ON WEB API (INTRODUCER IDENTIFICATION INFORMATION: Web_api_1111) — 1802

| SESSION ID | TIME OF CALL | CALLING INTRODUCER IDENTIFICATION INFORMATION | CALLED INTRODUCER IDENTIFICATION INFORMATION |
| --- | --- | --- | --- |
| 123456789abcdef | 2008/08/11 07:25:11:312 | web_site_9999 | web_api_1111 |
| 345678912cdefab | 2008/08/11 07:30:32:890 | web_site_8888 | web_api_1111 |
| 456789123defabc | 2008/08/11 07:39:58:922 | web_site_7777 | web_api_1111 |
| ... | | | |

INFORMATION PROVIDING METHOD AND ADVERTISEMENT PROVIDING METHOD

TECHNICAL FIELD

The present invention relates to an information providing method and an advertisement providing method. More particularly, the invention relates to a technique for providing an advertisement attached webpage generated by utilizing a web API which provides software capabilities on the Internet and defining web APIs that contributed to creation of the advertisement attached webpage for enabling distribution of referral fees for the advertisement.

BACKGROUND ART

Such a system as follows is widely utilized today: the operator of a website published on the Internet makes a contract with an advertisement agent that runs an advertisement intermediary service and posts an advertisement for an enterprise distributed by the advertisement intermediary service on the webpage. And a referral fee is paid to the website operator based on the number of times the advertisement is displayed on viewers' Web browsers or viewers select a link in the advertisement to move to a corresponding webpage of the enterprise, or the number of times viewers select the advertisement to move to a corresponding page that sells the enterprise's products and buy such products and/or the amount of purchase.

For instance, AdSense (Non-Patent Document 1) of Google (a registered trademark) solicits Web operators to post advertisements on their webpages. Google has a Web operator post an advertisement on his webpage and pays a referral fee to the Web operator when a viewer of the webpage clicks a link in the advertisement.

A conventional mechanism for posting an advertisement on a website is conceptually illustrated in FIG. 11. When a webpage request 211 is made to a website 201 from a Web browser 102, the website 201 provides an advertisement attached webpage 212. Here, the website 201 typically transmits HTML containing a URL indicating the location at which advertisement information resources are stored, and upon receiving the HTML, the Web browser makes an advertisement information request 213 to ask for resources from the URL of the advertisement information resources. When advertisement information 214 is returned, the Web browser displays advertisement information. Advertisement information is typically rendered using an image and/or animation for catching viewers' attention. Such an images or animation is designed as a link so that a page containing more detailed information (typically a webpage of the enterprise posting the advertisement) can be returned when a viewer selects the advertisement.

In the link, introducer identification information is embedded. When a viewer of the webpage selects the advertisement on a web browser, a notice of advertisement selection 215 is sent to the advertisement intermediary service 202. Upon receiving the request, the advertisement intermediary service 202 redirects the viewer to the website of the enterprise 106 that corresponds to the advertisement and displays a page corresponding to the advertisement on the web browser 102. Here, the advertisement intermediary service 202 counts the number of times the advertisement is selected for each piece of introducer identification information or the like by utilizing the introducer information embedded in the link of the advertisement. Based on the result of counting, the advertisement agent determines an amount to pay as a referral fee.

The invention according to Patent Document 1 describes a method for the purchaser of a product to select a party to which a referral fee is paid such as when one buys a product through an affiliate advertisement.

The invention according to Patent Document 2 describes a method for embedding a web browser in a portion of an application having a GUI and displaying an advertisement on the browser. By doing so, the invention realizes such control as to enable utilization of functions of the application only while the advertisement is displayed, for example.

Patent Document 1: Japanese Patent Laid-Open Publication No. 2007-18200

Patent Document 2: Japanese Patent Laid-Open Publication No. 2003-323571

Non-patent Document 1: Google AdSense https://www.google.com/adsense/login/ja/index.html

DISCLOSURE OF THE INVENTION

Problems to be Solved by the Invention

Web APIs, which are mechanisms for providing software capabilities on the Internet, are receiving attention. Web application developers can realize high-performance web applications at low costs by combining web APIs provided by other developers.

Various types of web APIs are available, such as user authentication, syntax analysis of a given sentence, retouch of a given image, provision of map information, and so forth. Information returned by a web API can be modified by a web application developer to be embedded in a webpage and displayed on a web browser. Because they permit modification, even when advertisement information is returned together as a returned value from a web API, a web application developer could eliminate the information, making it difficult for the provider of the web API to gain referral fees for advertisements.

With the technique of Patent Document 1, although the purchaser of a product is allowed to select a party to pay a referral fee, fair payment of referral fees is difficult because selection of whom to pay depends on the purchaser's judgment.

Also, using the technique of Patent Document 2, web API developers can obtain an opportunity to gain advertisement revenues through an application running on a computer, not through a webpage, but the application is required to provide a GUI and the technique is not applicable to a web API that does not have a GUI.

In view of such problems, an object of the present invention is to provide an advertisement providing system and an advertisement providing method for providing an advertisement attached webpage generated by utilizing a web API which provides software capabilities on the Internet and defining web APIs that contributed to creation of the advertisement attached webpage for enabling distribution of referral fees for the advertisement.

Means for Solving the Problems

To attain the object, an information providing method according to the present invention is an information providing method using a web API program that provides software capabilities on an Internet, a web API utilizing program that utilizes the web API program, and a web API call control program that controls calls to the web API program, wherein web API call control is performed such that when the web API utilizing program is to call the web API program, the web API utilizing program acquires key information issued by the web API call control program and uses the key information to call the web API program, and the web API program confirms whether the key information received from the web API utilizing program is valid and returns a result of executing the web API program only if the key information is valid.

Furthermore, in the information providing method of the invention, web API call control is performed such that the web API utilizing program acquires a session ID from the web API call control program every time the web API utilizing program is to call the web API program and calls the web API program using the session ID as key information.

Furthermore, in the information providing method of the invention, web API call control is performed such that the web API utilizing program acquires from the web API call control program in advance a key that enables the web API utilizing program to call the web API program a plurality of times, and uses the key to call the web API program.

Furthermore, in the information providing method of the invention, web API call control is performed such that the web API program sends key information received from the web API calling program to the web API call control program, and the web API call control program verifies whether the key information received is valid information issued by the web API call control program and sends the result of verification to the web API program.

Furthermore, in the information providing method of the invention, web API call control is performed such that the web API program records the key information sent from the web API utilizing program and information that can identify a calling web API utilizing program and a called web API program in a log and regularly sends the log to the web API call control program, and the web API call control program analyzes the log to verify whether the key information is valid.

Furthermore, in the information providing method of the invention, when a web API program that provides software capabilities on an Internet is utilized by one or more web API utilizing programs, a usage amount of the web API program is measured by the web API program or the web API-utilizing program sending trends of calling of the web API program to the web API call control program.

Furthermore, in the information providing method of the invention, the web API utilizing program calls the web API program using key information which is uniquely determined for each web API utilizing program and the web API program sends the key information to the web API call control program so that the web API call control program measures the usage amount of a web API program that has been called.

Furthermore, in the information providing method of the invention, a called web API program is identified by recording a web API program utilized by the web API utilizing program in a log or recording a web API utilizing program in which the web API program was called, regularly sending the log to the web API call control program, and analyzing the log by the web API call control program.

Furthermore, in the information providing method of the invention, both logs for the web API utilizing program and logs for the web API program are sent to the web API call control program to be compared with each other, and any mismatch relating to a web API call between the logs is detected to find an invalid log.

Furthermore, in the information providing method according to the invention, the web API utilizing program acquires a session ID issued by the web API call control program before calling the web API program; the web API call control program records the web API utilizing program to which the session ID has been issued; and after the web API calling program calls the web API program using the session ID, the web API program sends the session ID to the web API call control program so that the web API call control program identifies the calling web API utilizing program and the called web API program.

Also, an advertisement providing method according to the invention is an advertisement providing method using a website that provides a webpage on an Internet, wherein the website is a webpage that uses one or more web APIs, and when an advertisement provided by an advertisement intermediary service is posted on the webpage and the advertisement posted on the webpage is selected, a web API that was utilized by the website for creation of the webpage is identified and a consideration is paid to a provider of the web API.

Furthermore, the advertisement providing method according to the invention comprises a web browser processing device on which the web browser is run, a website processing device on which the website is run, web API processing device on which the web API is run, and an advertisement intermediary service processing device on which the advertisement intermediary service is run, the processing devices being interconnected by a network, wherein upon receiving a request for the webpage from the web browser, the website processing device sends introducer identification information of an operator of the website to the advertisement intermediary service processing device, acquires a session ID and advertisement identification information from the advertisement intermediary service processing device, and calls the web API including the session ID in an argument; the web API processing devices sends the session ID and the introducer identification information of the web API provider to the advertisement intermediary service processing device; the advertisement intermediary service processing device verifies that the session ID is valid and records the session ID and the introducer identification information of the web API provider; if the session ID is found valid on the advertisement intermediary service processing device, the web API processing device executes the web API and returns a result of processing to the website processing device; the website uses the result of processing, a URL of advertisement information possessed by the advertisement intermediary service, and the session ID to generate a webpage in which the session ID is included as a parameter in the URL for retrieving a resource of the advertisement information and returns the webpage to the web browser; and when the web browser requests the resource of the advertisement information from the advertisement intermediary service processing device, the advertisement intermediary service processing device records the request for the advertisement information in association with the session ID, and returns the resource of the advertisement information to the web browser, and the web browser displays the webpage generated by the website.

Furthermore, the advertisement providing method according to the invention comprises a web browser processing device on which the web browser is run, a website processing device on which the website is run, a web API processing device on which the web API is run, and an advertisement intermediary service processing device on which the advertisement intermediary service is run, the processing devices being interconnected by a network, wherein upon receiving a request for the webpage from the web browser, the website processing device returns a page that contains a session ID requesting program, a web API calling program, and a page generating program to the web browser; the web browser executes the programs contained in the returned page to thereby send introducer identification information of the web API provider to the advertisement intermediary service processing device; upon receiving a request, the advertisement intermediary service processing device carries out session ID generation and contributor recording and returns the session ID to the web browser; the web browser sends the session ID and the introducer identification information of the web API provider to the advertisement intermediary service processing device; the advertisement intermediary service processing device confirms that the session ID is valid and records the session ID and the introducer identification information of the web API provider; if the session ID is found valid on the advertisement intermediary service processing device, the web API processing device executes the web API and returns a result of processing to the web browser; the web browser generates the webpage; and when the web browser requests the resource of advertisement information from the advertisement intermediary service processing device, the advertisement intermediary service processing device records the request for the advertisement information in association with the session ID, and returns the resource of the advertisement information to the web browser, and the web browser displays the generated webpage.

Furthermore, the advertisement providing method according to the invention comprises a web browser processing device on which the web browser is run, a website processing device on which the website is run, a web API processing device on which the web API is run, and an advertisement intermediary service processing device on which the advertisement intermediary service is run, the processing devices being interconnected by a network, wherein upon receiving a request for the webpage from the web browser, the website processing device sends introducer identification information of the operator of the website to the advertisement intermediary service processing device, acquires a session ID and advertisement identification information from the advertisement intermediary service processing device, and makes a web API call including the session ID in an argument to the advertisement intermediary service processing device; the advertisement intermediary service processing device confirms that the session ID is valid, records the session ID and the introducer identification information of the web API provider, and carries out the web API call; the web API processing device executes the web API and sends the result of processing to the advertisement intermediary service processing device; the advertisement intermediary service processing device sends the result of processing to the website processing device; the website uses the result of processing, the URL of advertisement information possessed by the advertisement intermediary service, and the session ID to generate a webpage in which the session ID is included as a parameter in the URL for retrieving a resource of the advertisement information and returns the webpage to the web browser; and when the web browser requests the resource of the advertisement information from the advertisement intermediary service processing device, the advertisement intermediary service processing device records the request for the advertisement information in association with the session ID, and returns the resource of the advertisement information to the web browser, and the web browser displays the webpage generated by the website.

Furthermore, the advertisement providing method according to the invention comprises a web browser processing device on which the web browser is run, a website processing device on which the website is run, a web API processing device on which the web API is run, and an advertisement intermediary service processing device on which the advertisement intermediary service is run, the processing devices being interconnected by a network, wherein upon receiving a request for the webpage from the web browser, the website processing device carries out a web API call to the advertisement intermediary service processing device; the advertisement intermediary service processing device generates a session ID, records introducer identification information of the web API provider, records the introducer identification information of a called web API as a contributor with the session ID, and makes a web API call to the web API processing device including the session ID in an argument; in response to the call, the web API processing device executes the web API and sends the result of processing to the advertisement intermediary service processing device; the advertisement intermediary service processing device sends the result of processing and the session ID to the website processing device; the website uses the result of processing, the URL of advertisement information possessed by the advertisement intermediary service, and the session ID to generate a webpage in which the session ID is included as a parameter in the URL for retrieving a resource of the advertisement information and returns the webpage to the web browser; and when the web browser requests the resource of the advertisement information from the advertisement intermediary service processing device, the advertisement intermediary service processing device records the request for the advertisement information in association with the session ID, and returns the resource of the advertisement information to the web browser, and the web browser displays the webpage generated by the website.

Furthermore, in the advertisement providing method according to the invention, when an advertisement displayed on the web browser generated is selected by a viewer, the advertisement identification information and the session ID reach the advertisement intermediary service processing device, and the advertisement intermediary service processing device records the selection and the session ID corresponding to the selection, and the advertisement intermediary service redirects the web browser to a website of an enterprise related to the advertisement identification information to display a webpage corresponding to the advertisement.

Furthermore, in the advertisement providing method according to the invention, a website operator and a web API provider that contributed to generation of the webpage on which the advertisement is displayed are identified by utilizing a session ID with which advertisement information recorded in the advertisement intermediary service processing device was requested and extracting introducer identification information associated with the session ID.

Furthermore, in the advertisement providing method according to the invention, a website operator and a web API provider that contributed to generation of the webpage on which the advertisement has been selected are identified by utilizing a session ID which was used in selection of an advertisement recorded in the advertisement intermediary service processing device and extracting introducer identification information associated with the session ID.

Furthermore, in the advertisement providing method according to the invention, when a web API utilized by a website is identified by using not a session ID but a key that can uniquely identify a website, the website acquires a key in advance that can uniquely identify the website and sends the key together when calling the web API; the web API sends the key to the advertisement intermediary service; the advertisement intermediary service maintains the key and the web API from which the key was sent in association; the website sends a webpage in which a result of processing from the web API and an advertisement are embedded to the web browser; the key is inserted as a parameter in a URL which is used on the web browser for retrieving an image or the like of the embedded advertisement information so that the key is passed to the advertisement intermediary service when the image or the like of the advertisement information is retrieved from the advertisement intermediary service, the key is also inserted in a URL to which the browser moves when the advertisement is clicked so that the key is sent to the advertisement intermediary service when the advertisement is displayed on the web browser or the advertisement is clicked by a viewer, thereby enabling viewing trends of the advertisement to be grasped; and degree of contribution to an advertisement for each website is identified based on a number of viewings, and a web API utilized on each website and the number of utilizations thereof are identified based on information that maintains the key and web APIs in association.

Furthermore, in the advertisement providing method according to the invention, one or both of the website and the web API maintains call logs for the web API with the session ID or the key and regularly sends the logs to the advertisement intermediary service, and the advertisement intermediary service analyzes the logs to identify a web API utilized by the website.

Furthermore, in the advertisement providing method according to the invention, the advertisement intermediary service receives a log from the website and a log from the web API, compares contents of the logs with each other, and determines that a call is an authentic call when the two logs include an indication that the website called the web API or the web API was called.

The invention further provides a consideration distribution method for distributing to web API providers a consideration that accrues when an advertisement is displayed on a web browser or the advertisement is clicked, wherein when a web browser requests a webpage on which the advertisement is displayed, one or more web APIs that were utilized on a website that has received the request are identified, and a consideration that has accrued is distributed to web API providers.

The invention further provides a consideration distribution method for distributing a consideration that accrues when an advertisement is displayed on a web browser or the advertisement is clicked, to web API providers for each certain time period, wherein a total amount of consideration that has accrued from the website within the certain time period and a number of times one or more web APIs were utilized by the website are determined from collected records on a website that contributed to the advertisement and web APIs that were utilized by the website, and the total amount of consideration is distributed to the providers of the web APIs in accordance with the number of utilizations of the respective web APIs.

Furthermore, the advertisement providing method of the invention is for selecting an advertisement for display in accordance with a type of a web API being utilized, wherein the advertisement intermediary service manages a web API and one or more keywords relating to the web API, manages advertisement information and keywords relating to the advertisement, upon receiving a request for advertisement information from the web browser, uses a session ID to identify a web API utilized or uses a key to identify a web API frequently utilized on the website, retrieves keywords relating to the web API, and selects advertisement information that contains the keywords so as to provide the web browser with an advertisement appropriate for a web API being utilized.

Furthermore, in the advertisement providing method of the invention, the usage amount of a web API for requests from the web browser that have occurred within a certain time period is measured instead of the usage amount of the web API for all requests from the web browser, and the amount of consideration for contribution to the advertisement to be distributed to the web API is determined based on the result of measurement.

Advantage of the Invention

The present invention can provide an advertisement attached webpage which is generated utilizing a web API that provides software capabilities on the Internet, define web APIs that contributed to generation of the webpage, and enable distribution of a referral fee accruing from the advertisement.

BRIEF DESCRIPTION OF THE DRAWINGS

FIG. 18 shows an example log according to the seventh embodiment.

Figure 1:
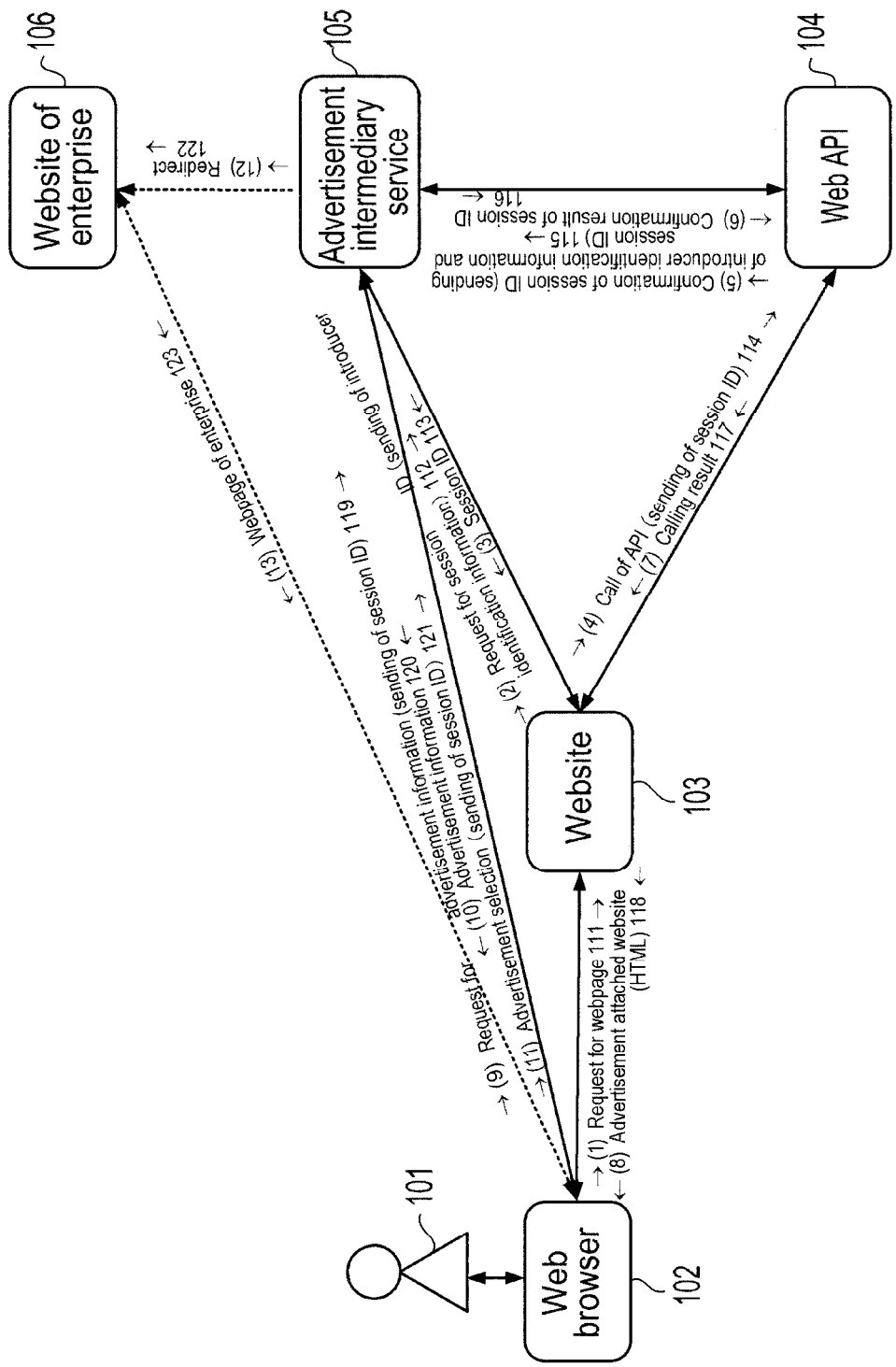
FIG. 1 conceptually illustrates a first embodiment.

DESCRIPTION OF SYMBOLS 101 viewer
102 web browser
103 website
104 web API
105 advertisement intermediary service
106 website of enterprise
201 website
202 advertisement intermediary service
300 advertisement intermediary service processing device
301 control section
302 storage section
303 communication section
304 network
311 session ID generating section
312 session ID confirming section
313 contributor recording section
314 advertisement requestor IP acquiring section 315 advertisement retrieving section
316 selection recording section
317 referral fee calculating section
318 transmission/reception section
321 website management table
322 web API management table
323 session management table
324 contributor recording table
325 advertisement information storage table
331 introducer identification information field
332 website URL field
333 account number field
335 introducer identification information field
336 web API URL field
337 account number field
341 session ID field
342 generation time field
343 advertisement requestor's IP field
344 selection/non-selection field
345 session ID field
346 introducer identification information field
351 advertisement ID field
352 classification field
353 advertisement image field
354 enterprise URL field
360 web browser
370 website processing device
371 session ID requesting section
372 web API calling section
373 page generating section
374 transmission/reception section
375 HTML
376 image
380 web API processing device
381 transmission/reception section
382 web API function section
383 session ID confirmation requesting section
384 famous people's birthday table
401 website processing device of enterprise
500 web browser screen
501 advertisement display area
502 area for displaying famous people who were born today
801 website
802 web API
803 advertisement intermediary service
900 advertisement intermediary service processing device
901 control section
902 web API intermediary section
1401 key field
1402 advertisement request time field
1403 key field
1404 key field
1405 advertisement selection time field
1406 key field
1407 advertisement selector's IP field
1408 time field
1701 log managing section
1702 log
1703 log summarizing section
2001 keyword field
2002 keyword field

BEST MODE FOR CARRYING OUT THE INVENTION

Now, a best mode for carrying out the present invention will be described.

First Embodiment

A mechanism for a web API provider to gain advertisement revenues utilizing an advertisement intermediary service is conceptually illustrated in FIG. 1.

A web browser 102, a website 103, a web API 104, an advertisement intermediary service 105, and a website of an enterprise 106 respectively run on a web browser processing device, a website processing device, a web API processing device, an advertisement intermediary service processing device, and an enterprise's website processing device. These devices are interconnected by a network. The processing devices are computers.

A website operator who wants to utilize the web API 104 makes a contract with the advertisement agent to get introducer identification information. A web API provider who wants to gain referral fees also makes a contract with the advertisement agent to get introducer identification information.

First, a webpage request 111 is made from the web browser 102 to the website 103.

On the website, a session ID request 112 is made to the advertisement intermediary service 105. At this point, the introducer identification information of the website operator is sent. Upon receiving the session ID request, the advertisement intermediary service 105 generates and returns a session ID 113, which is an ID for identifying a request from the web browser. The advertisement intermediary service 105 records the combination of the session ID and the introducer identification information in a database or the like.

Next, on the website 103, an API call is made 114 to call the web API 104. Here, the session ID received from the advertisement intermediary service 105 is sent to the web API 104. Also, if needed, data necessary for execution of the web API is also sent from the website 103 to the web API 104.

To verify the session ID received, the web API 104 performs session ID confirmation 115 to the advertisement intermediary service 105 and sends the introducer identification information of the web API 104 and the session ID.

The advertisement intermediary service 105 checks if the session ID is valid based on such information as whether the ID was issued by the advertisement intermediary service 105 or when it was issued (whether it has not expired). If the session ID is found to be valid, the combination of the session ID and the introducer identification information of the web API provider is recorded in a database or the like. The result is returned to the web API 104 as the result of session ID confirmation 116.

If the ID is valid as a result of session ID confirmation, the web API 104 executes the functions of the API 104 and returns a calling result 117 to the website 103.

The website 103 uses the calling result 117 from the web API 104 to compose HTML representing a webpage. Also, for display of an advertisement, the URL of an advertisement information resource is embedded in the HTML. In the URL, the session ID and/or an advertisement ID which is used for identification of the advertisement are embedded. The session ID is also embedded in a link which will be used for moving the viewer to a page providing more detailed information when the viewer has selected the advertisement on the web browser 102.

When the composed HTML for an advertisement attached webpage 118 is sent to the web browser 102, the web browser 102 retrieves the resource to be embedded in the HTML from the location indicated by the URL. Advertisement information is one of resources and is obtained by making an advertisement information request 119 to the URL. Advertisement information resources are managed by the advertisement intermediary service 105, and the session ID is included in the URL of a resource utilized here. By recording the session ID and the fact that the advertisement information was requested, the advertisement intermediary service 105 can learn in connection with which session ID the advertisement information was requested.

Next, the advertisement intermediary service 105 returns the advertisement information 120 requested to the web browser 102.

When the advertisement information 120 is received by the web browser 102, the information 120 is displayed on the web browser 102.

If the advertisement intermediary service 105 charges for display of an advertisement, the service 105 calculates a referral fee by identifying the number of times the advertisement has been displayed, and a website operator and web API providers involved in display.

If the service 105 charges when the advertisement displayed on the web browser 102 is selected such as by clicking by a viewer 101, the following process is also performed.

A link in the advertisement is a link to the advertisement intermediary service 105, and the session ID and an advertisement ID, which is used for identifying the advertisement, are included as parameters in the URL so that the session ID and the advertisement ID are sent together when the advertisement is selected.

When the viewer 101 selects the advertisement, a request for advertisement selection 121 is sent to the URL.

The advertisement intermediary service 105 records the session ID included in the URL and the fact that the advertisement was selected in a database or the like, and redirects 122 the viewer to a corresponding page providing more detailed information about the advertisement (the website of the enterprise 106) with reference to the advertisement ID. As a result, the enterprise's webpage 123 is returned to and displayed on the web browser.

Selection or non-selection of the advertisement, and a website operator and web API providers associated with the session ID when the advertisement was selected, which are recorded by the advertisement intermediary service 105, are identified, and a referral fee resulting from selection of the advertisement can be distributed among those who contributed to the advertisement based on a certain rule.

As a more specific example, consider a web API for indicating famous people's birthday. When the web API receives a request, it returns the names of famous persons who were born on a date passed as a parameter.

Assume that the operator of a website wants to add a function of displaying the names of famous persons whose birthday is today on his website by utilizing the web API.

Figure 2:
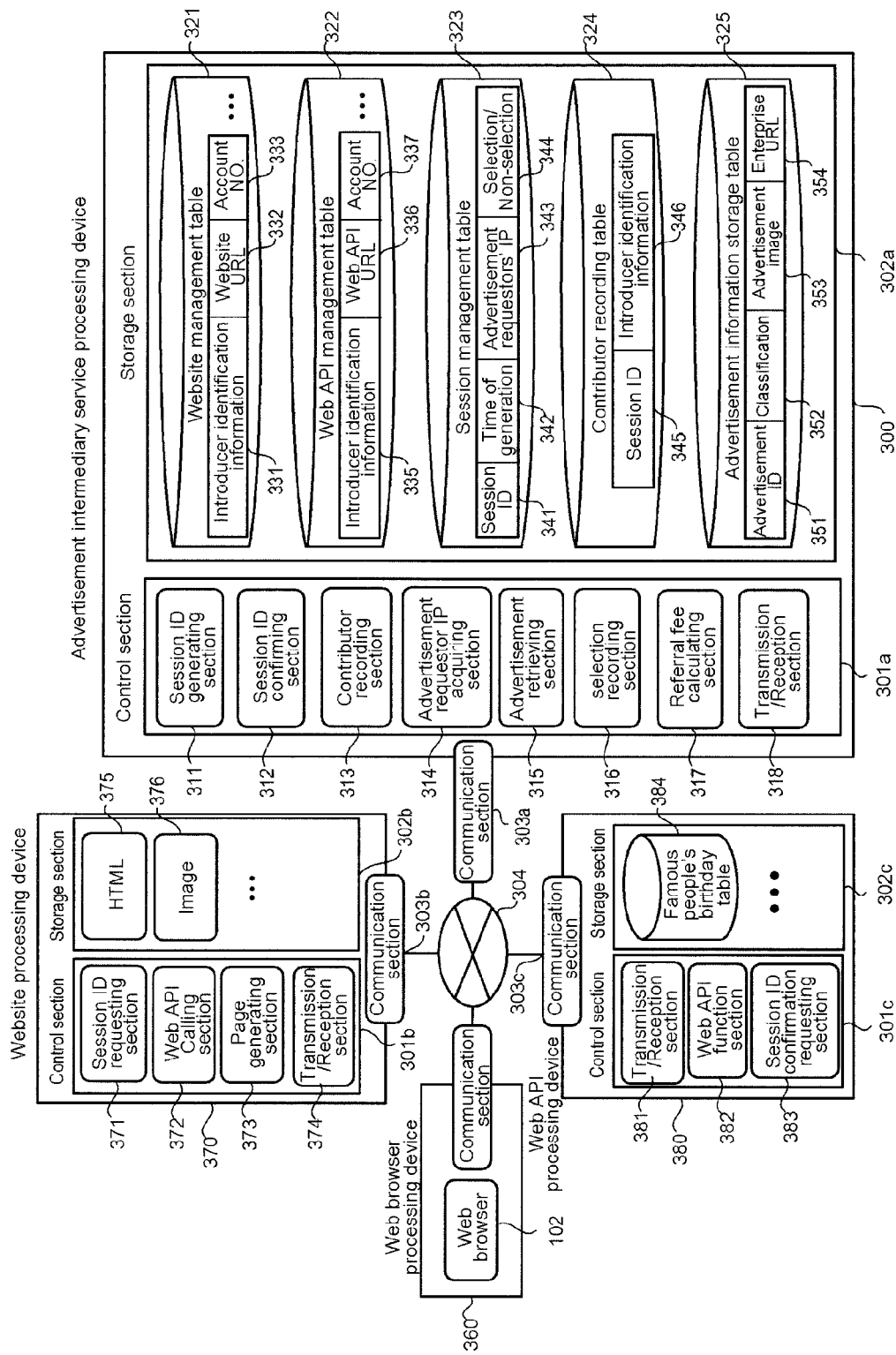
FIG. 2 shows a system configuration of the first embodiment.

A system configuration for realizing this is illustrated in FIG. 2. A web browser processing device 360 on which the web browser 102 runs, a website processing device 370 for returning webpages, a web API processing device 308 for providing software capabilities, and an advertisement intermediary service processing device 300 include communication sections 303, through which they connect to a network 304.

The processing devices are computers.

The web browser processing device 360 is a processing device on which the general web browser 102 runs and detailed descriptions thereof are omitted as it has no particular features unique to the present invention.

The website processing device 370 is a processing device that accepts a request from the web browser 102 and returns information, and includes a control section 301b and a storage section 302b. The control section 301b includes a transmission/reception section 374 (corresponding to a web server), a page generating section 373, a web API calling section 372, and a session ID requesting section 371. Although not directly relevant to the present invention, the storage section 302b of a website typically has HTML 375 and/or an image 376.

The web API processing device 380 performs processing appropriate for a request and returns the result requested by the requestor when a function of the web API is requested. In the present embodiment, the web API processing device 380 returns names of famous persons whose birthday is a date of interest. The web API processing device 380 includes a control section 301c and a storage section 302c. The control section 301c includes a transmission/reception section 381, a web API function section 382, and a session ID confirmation requesting section 383. The web API function section 382 returns names of famous persons whose birthday is a date of interest based on date. The storage section 302c has a famous people's birthday table 384. The famous people's birthday table 384 stores dates and the names of famous people who were born on the dates such that the dates and names are associated with each other.

The advertisement intermediary service processing device 300 includes a control section 301a and a storage section 302a. The control section 301a includes a session ID generating section 311, a session ID confirming section 312, a contributor recording section 313, an advertisement requestor IP acquiring section 314, an advertisement retrieving section 315, a selection recording section 316, a referral fee calculating section 317, and a transmission/reception section 318. The storage section 302a has a website management table 321, a web API management table 322, a session management table 323, a contributor recording table 324, and an advertisement information storage table 325.

The website management table 321 stores introducer identification information 331, website URL 332, account number 333, and the like.

The web API management table 322 stores introducer identification information 335, web API URL 336, account number 337, and the like.

The session management table 323 stores session ID 341, time of generation 342, advertisement requestors' IP 343, and selection/non-selection 344.

The contributor recording table stores session ID 345 and introducer identification information 346.

The advertisement information storage table stores advertisement ID 351, classification 352, advertisement images 353, and enterprise URL 354.

First, as preparation, a web API provider makes a contract with the advertisement intermediary service, registers the URL of a web API, an account number for payment of referral fees and the like, and receives introducer identification information issued. The introducer identification information and information registered by the web API provider are stored in the web API management table 322.

A website operator who wants to utilize the web API similarly makes a contract with the advertisement intermediary service, registers the URL of his website, an account number for payment of referral fees and the like, and receives introducer identification information issued. The introducer identification information and information registered by the website operator are stored in the website management table 321.

Figure 3:
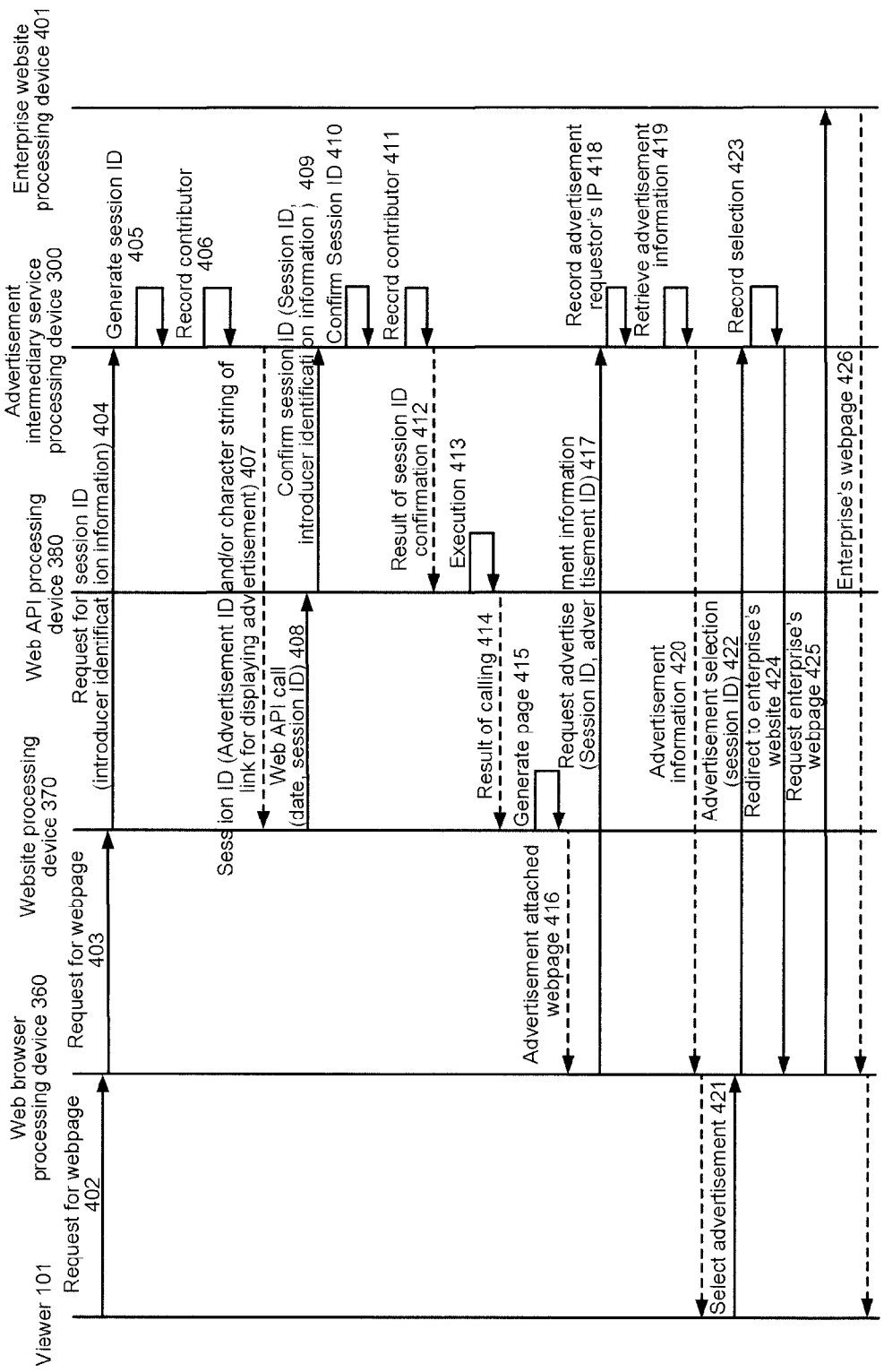
FIG. 3 is a sequence chart for the first embodiment.

A flow of processing performed when a page of a website is requested by the web browser 102 is shown in FIG. 3. In accordance with the flow, actions of the individual entities will be described.

When the viewer 101 operates the web browser 102 and makes a webpage request 402 for a website, the web browser 102 transmits a webpage request 403 to the website.

The website processing device 370 uses the session ID requesting section 371 to make a session ID request 404. With the request, introducer identification information (here shoukaisha_site_0978) is given as a parameter. A session ID is acquired by making an HTTP access to the advertisement intermediary service processing device 300 as shown below, for example:

http://koukoku_chuukai_service.com/get_session_id?shoukaisha_id= shoukaisha_site_0978

While various types of processing are requested with an HTTP GET request in the present embodiment, parameters may be passed using POST or Cookie.

Upon receiving the session ID request 404, the advertisement intermediary service processing device 300 generates a session ID using the session ID generating section 311, and records the session ID as the session ID 341 as well as the present time as the time of its generation in the session management table 323.

For the session ID, a unique ID is generated for each webpage request 403 from the web browser 102.

Next, using the contributor recording section 313, the session ID is recorded in a session ID field 345 of the contributor recording table 324 and the introducer identification information passed as a parameter is recorded in an introducer identification information field 346.

The generated session ID is passed to the website processing device 370.

An example of a returned session ID 407 is shown below, where the session ID 407 is returned in XML format.

```
<?xml version="1.0" encoding="UTF-8"?>
<item>
    <session_id>0123456789abcdef</session_id>
</item>
```

In addition to the session ID, an advertisement ID and/or a link character string for use as an advertisement may be returned.

An example of returning a session ID and an advertisement ID:

```
<?xml version="1.0" encoding="UTF-8"?>
<item>
    <session_id>0123456789abcdef</session_id>
    <koukoku_id>0255</koukoku_id>
</item>
```

An example of returning a session ID and a link character string:

```
<?xml version="1.0" encoding="UTF-8"?>
<item>
    <session_id>0123456789abcdef</session_id>
    <link><a
href="http://koukoku_chuukai_service.com/jump?koukoku_id=
0255&session_id=0123456789abcdef" ><img
src="http://koukoku_chuukai_service.com/koukoku_gazou?
koukoku_id=0255&session_id=0123456789abcdef"
></a></link>
</item>
```

As a further alternative, advertisement classification may be passed in an argument and the advertisement intermediary service processing device may randomly choose an advertisement ID 351 of an advertisement whose classification 352 matches the classification in the argument from the advertisement information storage table 325.

Next, the web API calling section 372 is used to make a web API call 408. With this call, the present date, which is data necessary for execution of the API, and the session ID are passed as parameters. Shown below is an example of a call in an HTTP access.

http://webapi_yuumeijin_birthday.com/get_names?date= 0811&session_id=0123456789abcdef When the request has arrived, the web API processing device 380 sends session ID confirmation 409 through the session ID confirmation requesting section 383, and verifies the validity of the session ID to the advertisement intermediary service processing device 300. Here, introducer identification information obtained in advance (here, shoukaisha_api_0888) is sent together. This can be realized by making the following HTTP access, for example:

http://koukoku_chuukai_service.com/check?session_id= 0123456789abcdef&shoukaisha_id=shoukaisha_api_0888

Upon receiving the request, the advertisement intermediary service processing device 300 checks whether the session ID passed in session_id parameter is valid. Specifically, the device 300 uses the session ID confirming section 312 to perform session ID confirmation 410. Validity of the session ID is determined based on whether the ID is present in the session management table 323, whether time exceeding a certain amount of time (e.g., five minutes) has passed since the time of generation 342 of the ID, or the like.

If the session ID is found to be valid, contributor recording 411 is carried out. The contributor recording section 313 is used to record the session ID and introducer identification information of the web API provider passed in "shoukaisha_id" parameter in the contributor recording table 324.

The result of session ID confirmation 412 is returned to the web API processing device 380. The result may be returned using XML as shown below, for example:

```
<?xml version="1.0" encoding="UTF-8"?>
<check>
    <session_id>0123456789abcdef</session_id>
    <result>valid</result>
</check>
```

In the example above, the result of confirmation is contained in "result" tag, and "valid" (as an example) is returned when the session ID is valid and "invalid" (an example) when the ID is not valid.

If the session ID is found to be valid on the web API processing device 380, the function of the web API is executed 413 by the web API function section 382. Specifically, famous persons whose birthday is the date received in "date" parameter are retrieved from the famous people's birthday table 384.

A list of famous persons retrieved is returned as the calling result 414. It may be returned using XML as shown below, for example.

```
<?xml version="1.0" encoding="UTF-8"?>
<response>
   <date>0811</date>
   <list>
      <name>Suzuki</name>
      <name>Takano</name>
   </list>
</response>
```

If the session ID is found to be invalid on the web API processing device 380, the caller of the web API is notified of the invalidity. An example is:

```
<?xml version="1.0" encoding="UTF-8"?>
<response>invalid</response>
```

Upon receiving the result of executing the web API on the website processing device 380, a page is generated 415 using the result and the advertisement.

Figure 4:
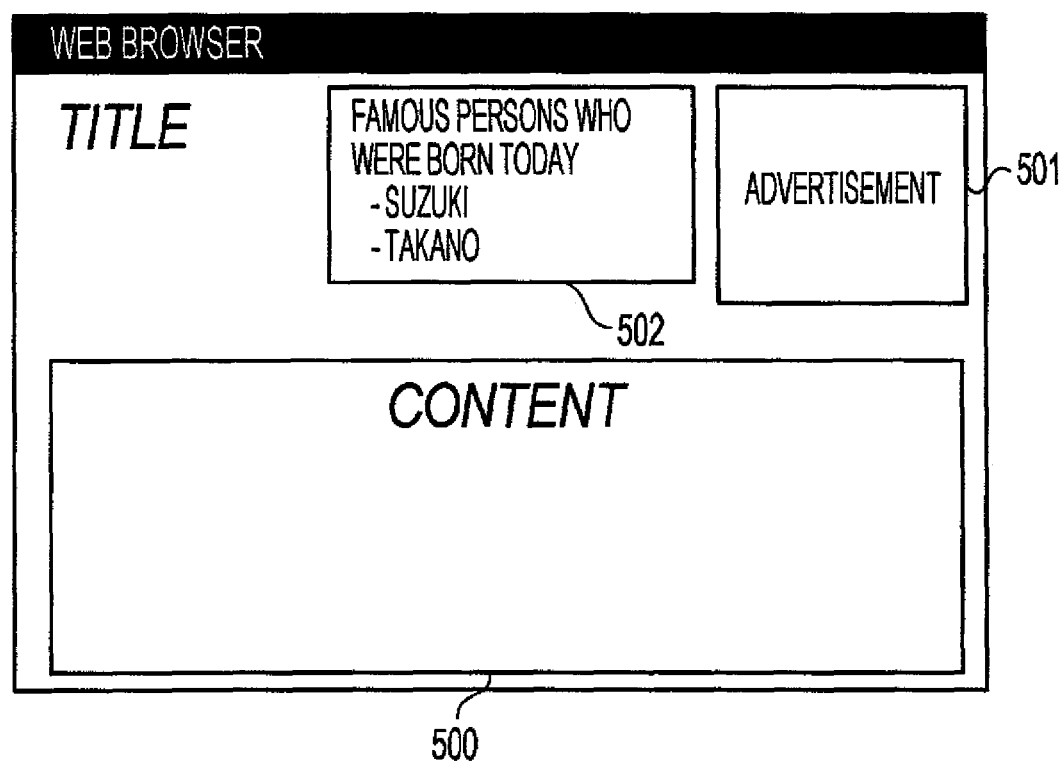
FIG. 4 shows an example image of a webpage provided by a website.

An example image of the generated page is shown in FIG. 4. At the top of the page, an area for displaying famous people who were born today 502 and an advertisement display area 501 are laid out.

In the famous people's birthday display area 502, the value returned from the web API is written converted to HTML.

The advertisement is embedded in the advertisement display area 501 in the form of a link as shown below:

```
<a href="http://koukoku_chuukai_service.com/jump?koukoku_id=
0255&session_id=0123456789abcdefg"><img src="http://
koukoku_chuukai_service.com/koukoku_gazou?koukoku_id=0255
&session_id=0123456789abcdefg"></a>
```

The value of "session_id" parameter (0123456789abcdefg) in the URL in the "a" tag or "img" tag is the value of session ID 407 that has been obtained as a result of making the session ID request 404 to the advertisement intermediary service processing device 300.

An advertisement ID to be embedded as "koukoku_id" parameter may be the advertisement ID of an advertisement selected by the website operator in advance, or if an advertisement ID is retuned with the session ID 407 as shown above, the advertisement intermediary service processing device 300 may return the advertisement ID. Alternatively, the entire link to the advertisement may be returned with the session ID 407 by the advertisement intermediary service processing device 300. In that case, a webpage with an advertisement can be realized by transcribing the character string of the link returned by the advertisement intermediary service processing device 300 into the advertisement display area 501 in the HTML as it is.

The website processing device 370 returns the advertisement attached webpage 416 to the web browser 102. The web browser 102 analyzes the returned webpage and further requests lacking information, if any.

In the present embodiment, "img" tag is present in the advertisement link in the HTML returned as a webpage, and the URL where the image is located is described in "src" attribute. The web browser 102 accesses the URL described in "src" attribute and makes an advertisement information request 417.

In response to the advertisement information request 417, the advertisement intermediary service processing device 300 records the IP address of the advertisement information requestor, namely the IP address of the web browser processing device 360, in the advertisement requestors' IP in the session management table 323 as recording of advertisement information requestor's IP 418, and then retrieves the advertisement image 353 from the advertisement information storage table 325 and returns it to the requesting web browser 102.

Although an image is returned as advertisement information in the present embodiment, Flash, JavaApplet, or a moving image may also be utilized as a link. Alternatively, an advertisement to be embedded could be obtained as HTML and displayed using "iframe" tag for embedding another piece of HTML in HTML, or the like.

The web browser 102 uses the advertisement information 420 obtained to compose and display a webpage.

The viewer 101 browses the webpage displayed on the web browser 102. If an interesting advertisement is displayed on the webpage, the viewer 101 selects the advertisement 421 such as by clicking the advertisement.

When the advertisement is selected 421, the web browser 102 sends a request for advertisement selection 422 to the URL of the link in the advertisement. The URL in the present embodiment is:

```
http://koukoku_chuukai_service.com/jump?koukoku_id=
0255&session_id=0123456789abcdefg
```

The advertisement intermediary service processing device 300 records the selection of the advertisement by setting "selected" in the selection/non-selection field 344 in the row of the session management table 323 corresponding to the session ID. The initial value of the selection/non-selection field 344 of the session management table 323 is null.

Next, the browser is redirected to the website of the enterprise (http://jigyousha_page.com). The advertisement intermediary service processing device 300 instructs the web browser 102 to redirect 424 to the enterprise's website, and the web browser 102 sends a request 425 for the enterprise's webpage to the website processing device 401 of the enterprise to retrieve the webpage 426 of the enterprise.

Redirection refers to a process of returning a response to the web browser 102 and sending a request automatically (i.e., without involving the viewer 101) to the URL to which the browser 102 will be redirected (i.e., the URL of the enterprise's website) to retrieve and display the webpage as the destination of redirection as shown above.

This can be realized by returning a status code for redirection (301 or 302) and the URL as the destination of redirection (http://jigyousha_page.com) to the web browser as a response so as to automatically send a request to the destination URL using functions of the web browser to retrieve a page from the website processing device 401 of the enterprise, or by returning HTML containing such a tag shown below to send a request to http://jigyousha_page.com using functions of the web browser 102 and retrieve the webpage 426 of the enterprise.

```
<META HTTP-EQUIV="refresh"
content="0;URL=http://jigyousha_page.com">
```

Method for Calculating Referral Fee

How to calculate a referral fee is determined according to various policies. An example will be shown. The process here is performed by the referral fee calculating section 317.

The present embodiment assumes that the referral fee paid by the advertisement agent each time an advertisement is selected is fixed at 30 yen, and when there is any web API that was involved in creation of a webpage on which the advertisement is displayed, an equal referral fee is paid to the provider of the web API and the website operator. For example, when two web APIs were utilized for creating a webpage on which an advertisement was selected, 10 yen is paid to each the operator of the website and the providers of the two web APIs, that is, 30 yen in total.

Figure 5:
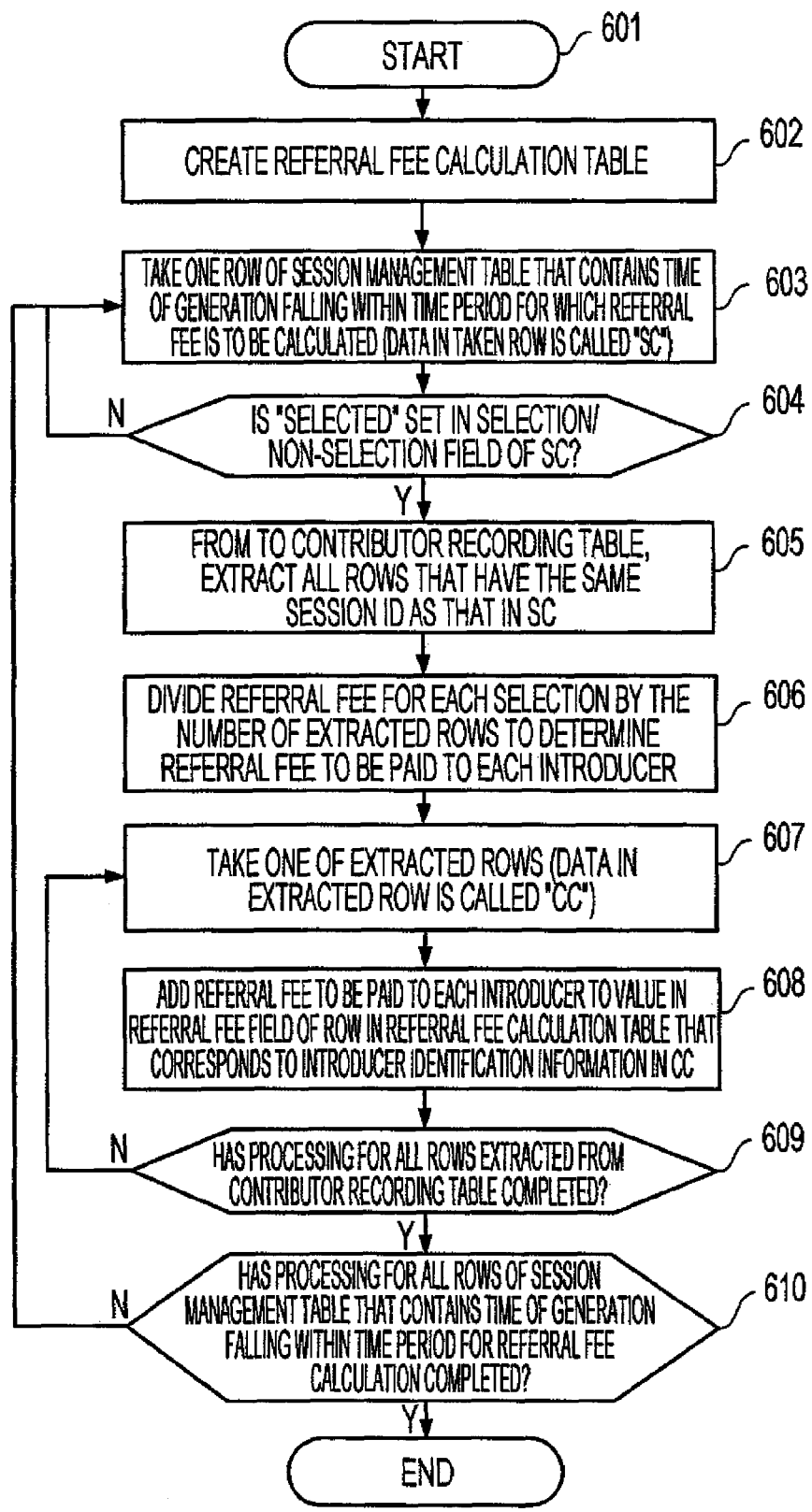
FIG. 5 is a flowchart illustrating an embodiment of referral fee calculation.

A process flow is shown in FIG. 5. First, a referral fee calculation table is created 602. The table maintains pairs of introducer identification information and referral fees, having rows for all pieces of introducer identification information, and zero is stored as the initial value of referral fee in each of the rows.

Next, one of rows of the session management table that have time of generation falling within a time period for which a referral fee should be calculated is taken (hereinafter, data in the taken row will be called "SC") 603. For example, for summation for August 2007, rows that have time of generation from 2007 Aug. 1 00:00:00 to before 2007 Sep. 1 00:00:00 are retrieved one by one.

It is checked whether the selection/non-selection field in SC is set to "selected" 604, and if it is not "selected", the next row is taken.

If it is "selected", a referral fee is calculated. From the contributor recording table, all rows that have the same session ID as the one in SC are extracted 605.

A referral fee to be paid to each introducer is determined by dividing the referral fee for one selection by the number of extracted rows 606.

Then, one of the extracted rows is taken (hereinafter, data in the taken row will be called "CC") 607.

The referral fee to be paid to each introducer is added to the value in the referral fee field of the row in the referral fee calculation table that corresponds to the introducer identification information in CC 608.

It is checked whether processing for all the rows extracted from the contributor table is completed 609, and if not completed, processing is repeated for the next row.

If processing for all the rows is completed, it is then checked whether processing is completed for all the rows of the session management table that have time of generation falling within the time period for referral fee calculation 610. If not completed, processing is repeated for the next row. If processing is completed for all of the rows, referral fee calculation is terminated.

As referral fees for individual pieces of introducer identification information are stored in the referral fee calculation table, the fees are paid to persons corresponding to those pieces of introducer identification information. Specifically, the fees may be paid to their accounts by utilizing account numbers stored in the account number field (333, 337) of the website management table 321 or the web API management table 322.

While the advertisement agent pays a referral fee when an advertisement is selected by a viewer in the present embodiment, it may pay a referral fee each time an advertisement is displayed on the web browser of a viewer. In that case, the step of checking whether the selection/non-selection field of SC is set to "selected" 604 may be replaced with a step of checking that the advertisement requestor's IP in SC has been recorded.

Method for Detecting a Fraud

Measures to reduce the risk of the advertisement intermediary service being deceived into paying a referral fee that is included in the concept of the invention will be described.

(1) In the present invention, every time a page request is made to a website from a web browser, the advertisement intermediary service issues and manages a session ID. As an alternative method, contribution of a website operator or a web API provider may be indicated to the advertisement agent by supplying their introducer identification information to the advertisement intermediary service. However, because this method permits introducer identification information to be supplied to the advertisement intermediary service even if a web API has not been actually utilized, a fraud could be committed. Use of the session ID of the present invention makes fraudulent acts difficult because it enables checking of whether a session ID returned by making session ID confirmation to the advertisement intermediary service from a web API is one issued by the advertisement intermediary service, whether too long time has not elapsed since its issuance, or the like.

(2) Another possible way of fraud is to increase the degree of contribution by recording the introducer identification information of a web API provider into the contributor recording table more than one time by performing session ID confirmation a number of times when the web API is called with a certain session ID. Such a fraud can be prevented by establishing a rule that charging can be made only once for one session ID and checking whether a row having the same session ID and introducer identification information is already present when writing a contributor to the contributor recording table in the advertisement intermediary service, and recording to the contributor recording table only when such a row does not exist. Alternatively, such a fraud could be prevented by writing into more than one row of the contributor recording table and, even if multiple rows containing the same pair of a session ID and introducer identification information are encountered at the time of calculation of referral fee, performing processing counting those rows as one occurrence.

(3) A website operator is required to post an advertisement on his or her webpage for utilizing a web API. For such a reason as impairing the appearance of a webpage, however, some website operators might want to utilize a web API but not want to post an advertisement. Using the present invention, when a link to an advertisement is not described in a webpage, an advertisement information request will not be transmitted to the advertisement intermediary service from a web browser. In the invention, when the advertisement intermediary service receives an advertisement information request, it records the advertisement requestor's IP in the session management table. Thus, when a webpage with no advertisement link embedded therein is provided, an advertisement requestor's IP address is not recorded. Session IDs in rows of the session management table in which an advertiser requestor's IP is not recorded are found in the contributor recording table, and from the introducer identification information contained in the first row found, a website operator who is not displaying the advertisement can be identified. Once such a website operator has been identified, some measures can be taken such as to warn him or stop him utilizing the web API.

Or if only recording of an advertisement requestor's IP is required, an IP address can be recorded in the advertisement requestor's IP field of the session management table by sending an advertisement information request to the advertisement intermediary service not from the web browser but from the website processing device. In this case, however, as the same IP address is stored every time or only several particular IP addresses are stored in the advertisement requestor's IP field, a suspicious website operator can be identified by analyzing the advertisement requestor's IP field of the session management table.

Using JavaScript or CSS, an advertisement could be made invisible on a web browser even if advertisement information is obtained by the web browser. In this case, advertisement selection rate would be extremely low. If such a website is found by checking the website management table, session management table, or contributor recording table, one can actually view the website to see if the advertisement is displayed.

To be specific, for each introducer in the introducer management table, all session IDs of introducer identification information corresponding to the introducer are retrieved from the contributor recording table (the number of session IDs is regarded as the number of times the webpage has been displayed), and all such rows of the session management table that correspond to the session IDs retrieved and that have "selected" in the selection/non-selection field are retrieved (the number of the retrieved rows is regarded as the number of selections). And if the number of selections divided by the number of times the webpage was displayed is below a threshold (e.g., 0.01), it is checked whether the advertisement is being properly displayed such as by viewing the webpage.

The first embodiment has such advantages as follows. It can provide web API providers with an opportunity to gain advertisement revenues. By passing around a session ID at the time of communication among the advertisement intermediary service, a web API, and a website, a mechanism that makes it difficult to commit fraudulent acts can be provided.

While the description of the present embodiment envisages a web API for indicating famous people's birthday, various web APIs are available such as ones for user authentication, syntax analysis of a given sentence, retouch of a given image, providing map information, and so on. Some web APIs require data for their execution, in which case data necessary for execution of a web API is applied instead of date used in the present embodiment. This also applies to the following embodiments.

Second Embodiment

While the first embodiment implements the session ID request 404, web API call 408, and page generation 415 on the website processing device 370, these processes may be realized on the web browser 102 using a programming language running on the web browser 102, such as JavaScript.

In this case, the session ID requesting section 371, the web API calling section 372, and the page generating section 373 which are provided in the website processing device 370 in the first embodiment are provided in the web browser 102.

Specifically, the website processing device 370 sends a webpage in which the session ID requesting section, web API calling section, and page generating section are included using JavaScript or the like to the web browser 102. The sections are executed on the web browser 102.

Figure 6:
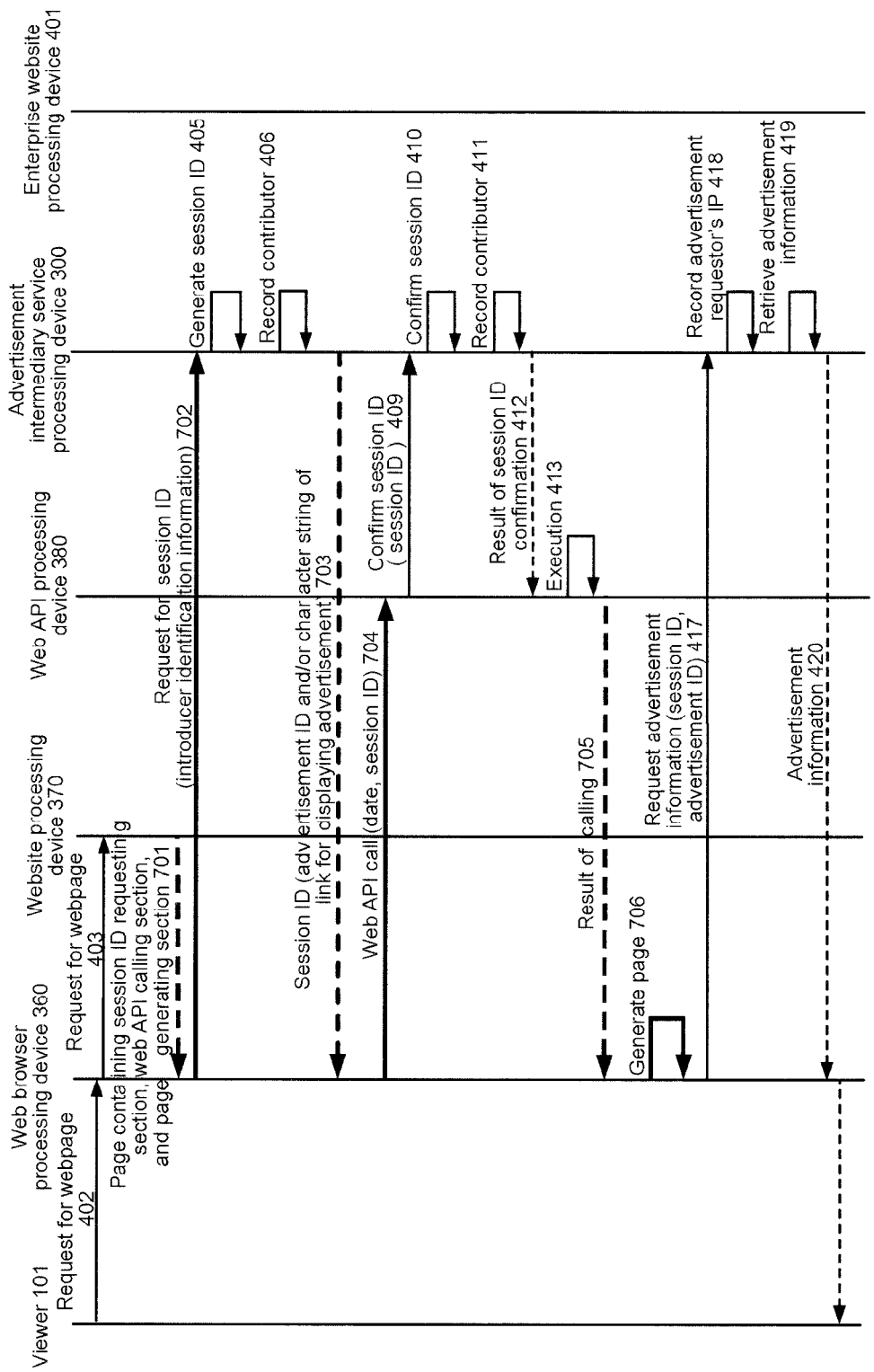
FIG. 6 is a sequence chart for a second embodiment.

Flow of processing is illustrated in FIG. 6.

Modifications to the first embodiment are indicated by bold lines. The following descriptions mainly focus on the modifications. When the webpage request 403 is made by the web browser 102, the website processing device 370 accepts the request by way of the transmission/reception section 374, and returns a page 701 including the session ID requesting section, the web API calling section, and the page generating section to the web browser 102.

The web browser 102 executes the programs included in the returned page.

First, the web browser 102 uses the session ID requesting section to make a session ID request 702 to the advertisement intermediary service processing device 300. As a parameter, it transmits introducer identification information.

In the second embodiment, the domain of the source of the webpage displayed on the web browser 102 (i.e., the website processing device 370) is different from that of the entity from which the session ID is requested (i.e., advertisement intermediary service processing device 300). On the current web browser 102, a direct access to a domain other than that of the source of webpages from JavaScript generally cannot be made for security reasons. A session ID requesting process using a method called JSONP, which enables access to other domains, will be described.

In a webpage, a tag for obtaining JavaScript from the advertisement intermediary service processing device is written as shown below:

```
<script src=
"http://koukoku_chuukai_service.com/get_session_id_json?callback=
receiveSessionID&shoukaisha_id=shoukaisha_site_0978"></script>
```

In callback parameter, a method that should be called by the web browser 102 when the session ID has been obtained is written. Also, a called method needs to be defined in the webpage as shown below.

```
<script>
function receiveSessionID( data) {   //processing for
execution after a session ID is acquired . . . }
</script>
```

When the webpage containing the tag for obtaining JavaScript from the advertisement intermediary service processing device 300 as described above is displayed, the web browser 102 sends an HTTP GET request to the advertisement intermediary service processing device 300.

Upon receiving the request, the advertisement intermediary service processing device 300 carries out session ID generation 405 and contributor recording 406 similar to those performed in the first embodiment and returns a response (the session ID 703). The response is:
receiveSessionID({"session_id": "0123456789abcdef"});

When the web browser 102 receives the response, it calls the receiveSessionID contained in the webpage shown above. By performing such processing, access to a domain different from the one in which the webpage was retrieved can be made.

As in the first embodiment, the advertisement intermediary service processing device 300 may also return an advertisement ID or a link to an advertisement in addition to the session ID.

An example of returning a session ID and an advertisement ID:

```
receiveSessionID({"session_id" : "0123456789abcdef",
    "koukoku_id" : "0255"});
```

An example of returning a session ID and a link character string:

```
receiveSessionID({"session_id" : "0123456789abcdef",
"link" : "<a
href=http://koukoku_chuukai_service.com/jump?koukoku_id=0255
&session_id=0123456789abcdef><imgsrc=
"http://koukoku_chuukai_service.com/koukoku_gazou?koukoku_id=
0255&session_id=0123456789abcdef"></a>"});
```

Next, the web browser 102 uses the web API calling section to make a web API call 704. As parameters, date and the session ID are passed. This call is also made using JSONP as with the session ID request 702, and description thereof is omitted. Processing performed on the web API processing device 380 after the web API call is similar to that in the first embodiment.

When the processing is completed, the web API processing device 380 returns the calling result 705 to the web browser 102.

The web browser 102 uses the page generating section to generate a page 706, including placement of an advertisement, display of result of the web API call, and the like.

If the generated webpage involves resources that has to be retrieved from outside, the web browser 102 performs a process for retrieving the resources. In the present embodiment, image information contained in the advertisement link is acquired by making the advertisement information request 417. As the procedure after this process is similar to the first embodiment, description thereof is omitted.

While the present embodiment shows an example where the session ID request, web API call, and page generation take place on the web browser, only a portion of the processes may be performed on the web browser.

For example, when the website processing device has received a webpage request, it makes a session ID request, creates a webpage containing the session ID obtained as well as the web API calling section and the page generating section, and returns the page to the web browser. And the web browser may use the session ID to perform web API call and page generation.

The second embodiment has such advantages as follows. It is an effective method for use when it is desirable to dynamically call a web API in accordance with a change in state when a change in state has occurred due to input of a text character string or the like in an entry form on the web browser 102, or when only a portion of a webpage, rather than the entire page, should be changed. For example, it is effective when a form for entering date is provided and a web API is immediately called upon the viewer 101 entering a date into the form to retrieve names of famous persons whose birthday is the date and rewrite only the famous people's birthday field 502 on the webpage screen. These ways of processing are possible because in the present embodiment the web browser composes a screen utilizing the result of a web API call.

Third Embodiment

An embodiment will be described in which a web API is called via the advertisement intermediary service processing device 300 instead of directly calling the web API processing device 380 when a web API is called from a website.

Figure 7:
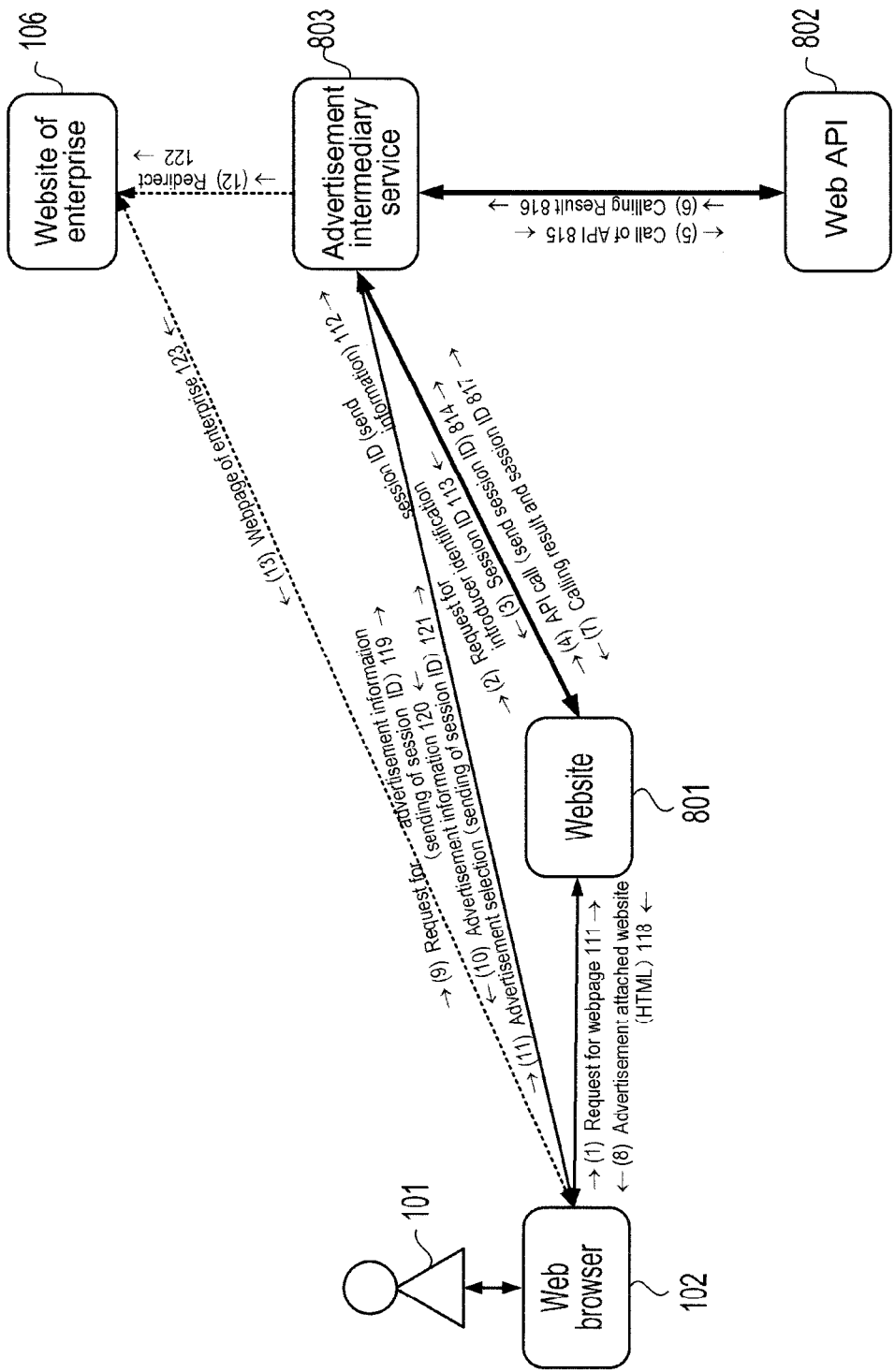
FIG. 7 conceptually illustrates a third embodiment.

FIG. 7 shows a conceptual illustration of the embodiment, in which modifications to FIG. 1 are indicated by bold lines.

While in FIG. 1 the API call 114 is made directly to a web API, the present embodiment effects it via an intermediary service 803. The advertisement intermediary service 803, in response to the API call 814, calls the specified web API 815 to get the calling result 816. After obtaining the calling result 816, the advertisement intermediary service 803 returns the result 816 to the website 801.

Figure 8:
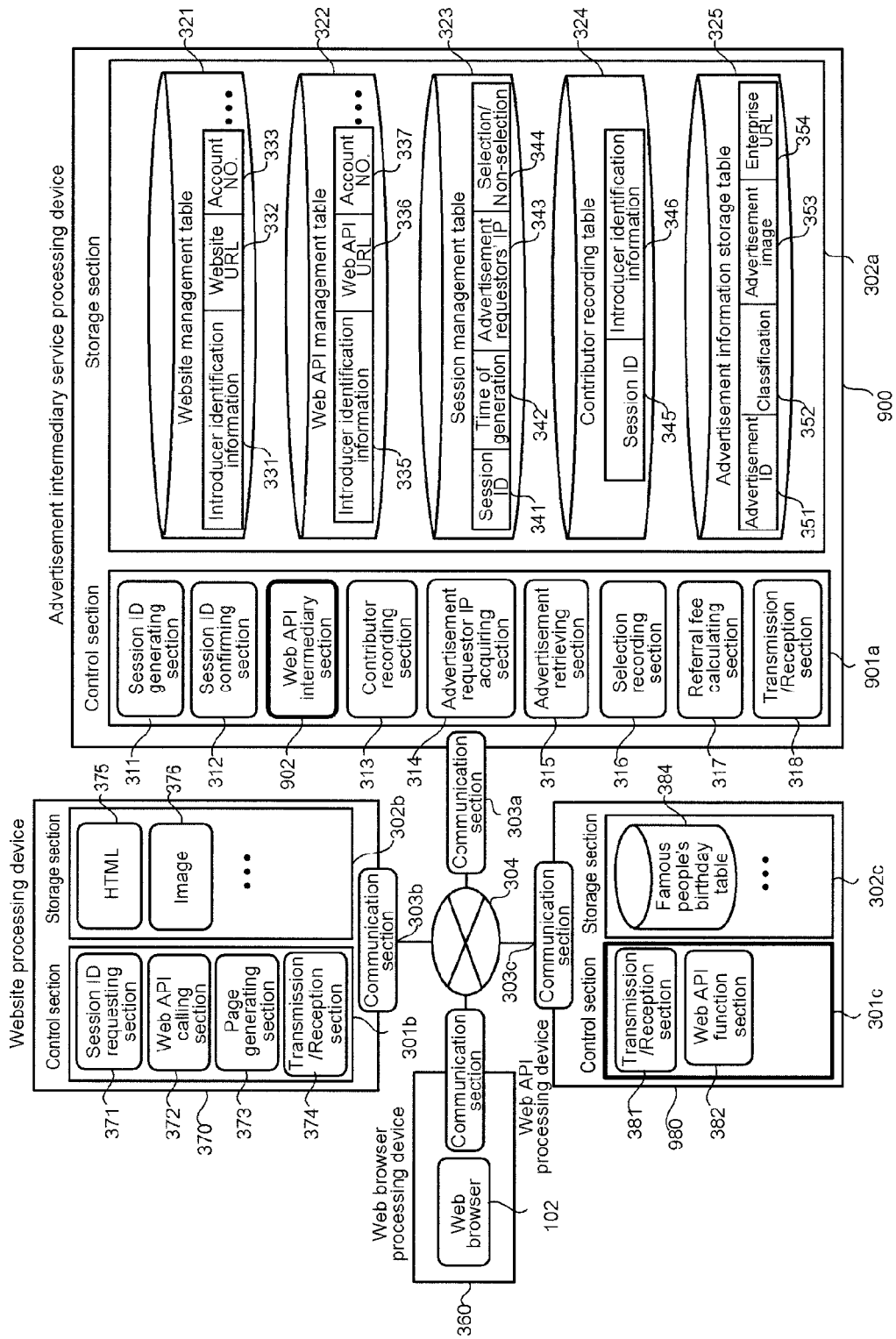
FIG. 8 shows a system configuration of the third embodiment.

A system configuration of the embodiment is shown in FIG. 8. A web API intermediary section 902 is newly provided in an advertisement intermediary service processing device 900, and the session ID confirmation requesting section of the web API processing device 980 is eliminated.

Figure 9:
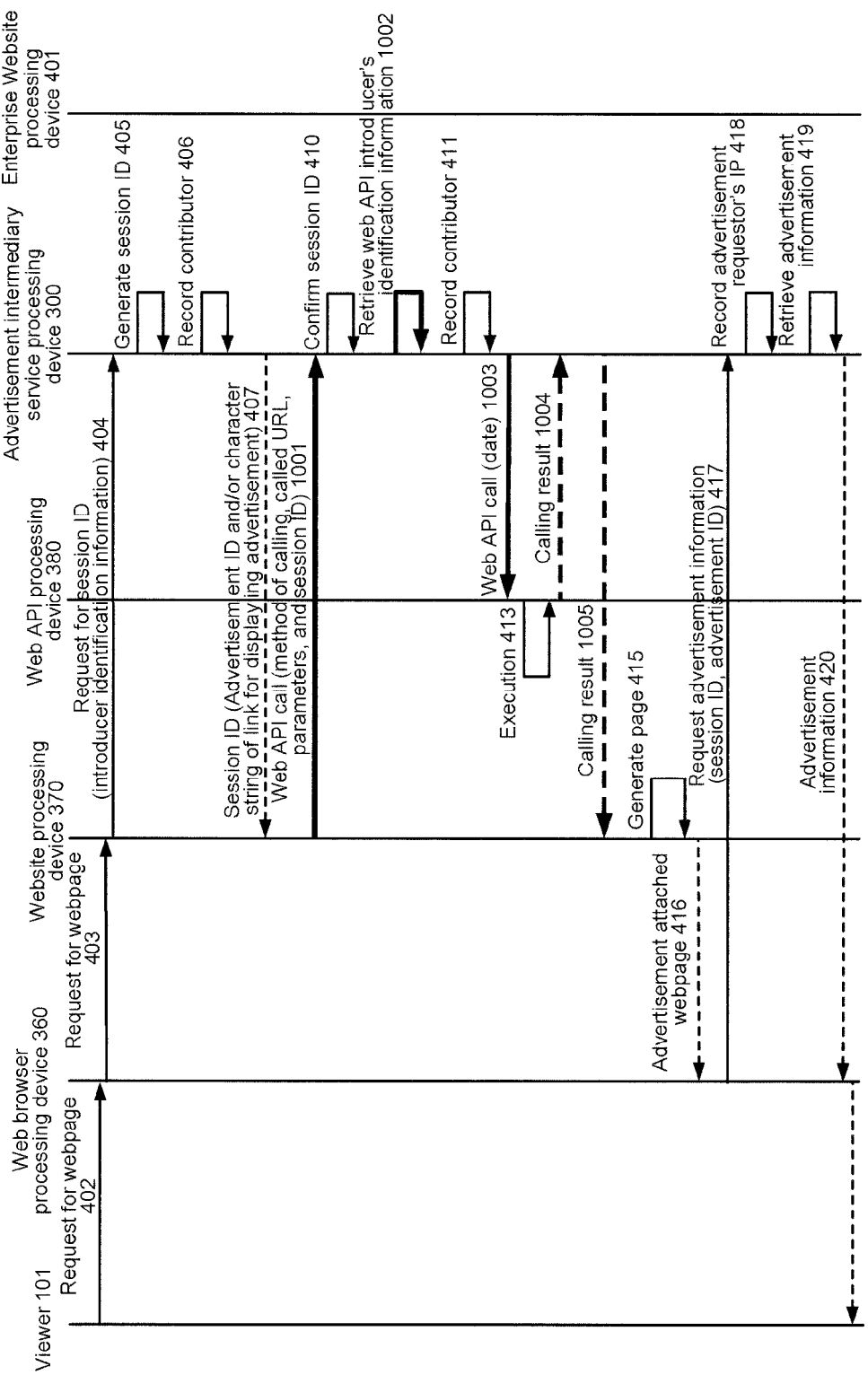
FIG. 9 is a sequence chart for the third embodiment.

A sequence chart is shown in FIG. 9, in which differences from the first embodiment are indicated by bold lines. The following descriptions mainly focus on the different portions. The website processing device 980 makes a web API call 1001 to the advertisement intermediary service processing device 900. It passes a calling scheme, a called URL, parameters, and a session ID as arguments. The calling scheme is HTTP GET, POST, or the like.

By way of example, when arguments are "get", "http://webapi_yuumeijin_birthday.com/get_names", "date=0811", and "0123456789abcdef", such a request as shown below is sent to the advertisement intermediary service.

http://koukoku_chuukai_service.com/call_webapi?method=get&url=
http%3A%2F%2Fwebapi_yuumeijin_birthday.-
com%2Fget_names¶m=date%3D0811&session_id=
0123456789abcdef In the request, "% xx" represents a character string after encoding which is performed at the time of sending parameters in HTTP.

Upon receiving the request, the advertisement intermediary service processing device 900 makes session ID confirmation 410 for the session ID received in session_id parameter. Specifically, validity of "0123456789abcdef" as the session ID is checked using the session ID confirming section 312. If the session ID is invalid, the advertisement intermediary service processing device 900 notifies the website processing device 370 of the invalidity of the session ID.

If the session ID is valid, introducer identification information for the web API is retrieved 1002. The retrieval can be realized by finding a row of the web API management table 322 that contains a web API URL matching the called URL (or that contains a host name matching the one included in the URL (webapi_yuumeijin_birthday.com)) and taking the introducer identification information in that row.

In contributor recording 411, the pair of the introducer identification information for the web API retrieved and the session ID is recorded in the contributor recording table 324 using the contributor recording section 313.

Next, web API call 1003 is performed. When the request according to the present embodiment is received, the web API intermediary section 902 sends an HTTP GET request to the URL shown below. Unlike in the first embodiment, a session ID needs not be sent here. http://webapi_yuumeijin_birthday.com/get_names?date=0811

Upon receiving the request, the web API processing device 980 executes 413 the web API function section to get a list of famous people whose birthday is the date received in date parameter, and returns the list to the advertisement intermediary service processing device 900 as the calling result 1004.

The advertisement intermediary service processing device 900 returns the list it received to the website processing device 321.

As the subsequent process is similar to the first embodiment, descriptions thereof are omitted.

The third embodiment has such an advantage as follows. While the first embodiment requires a web API to include processing for accepting or verifying a session ID, the third embodiment does not require such processing and thus involves less costs when an existing web API processing device is incorporated into the framework of the concept of the present invention.

Fourth Embodiment

In the third embodiment, session ID request 404 and web API call 1001 are separately performed from the website processing device 370. The fourth embodiment describes a case where session ID request and web API call are combined.

Figure 10:
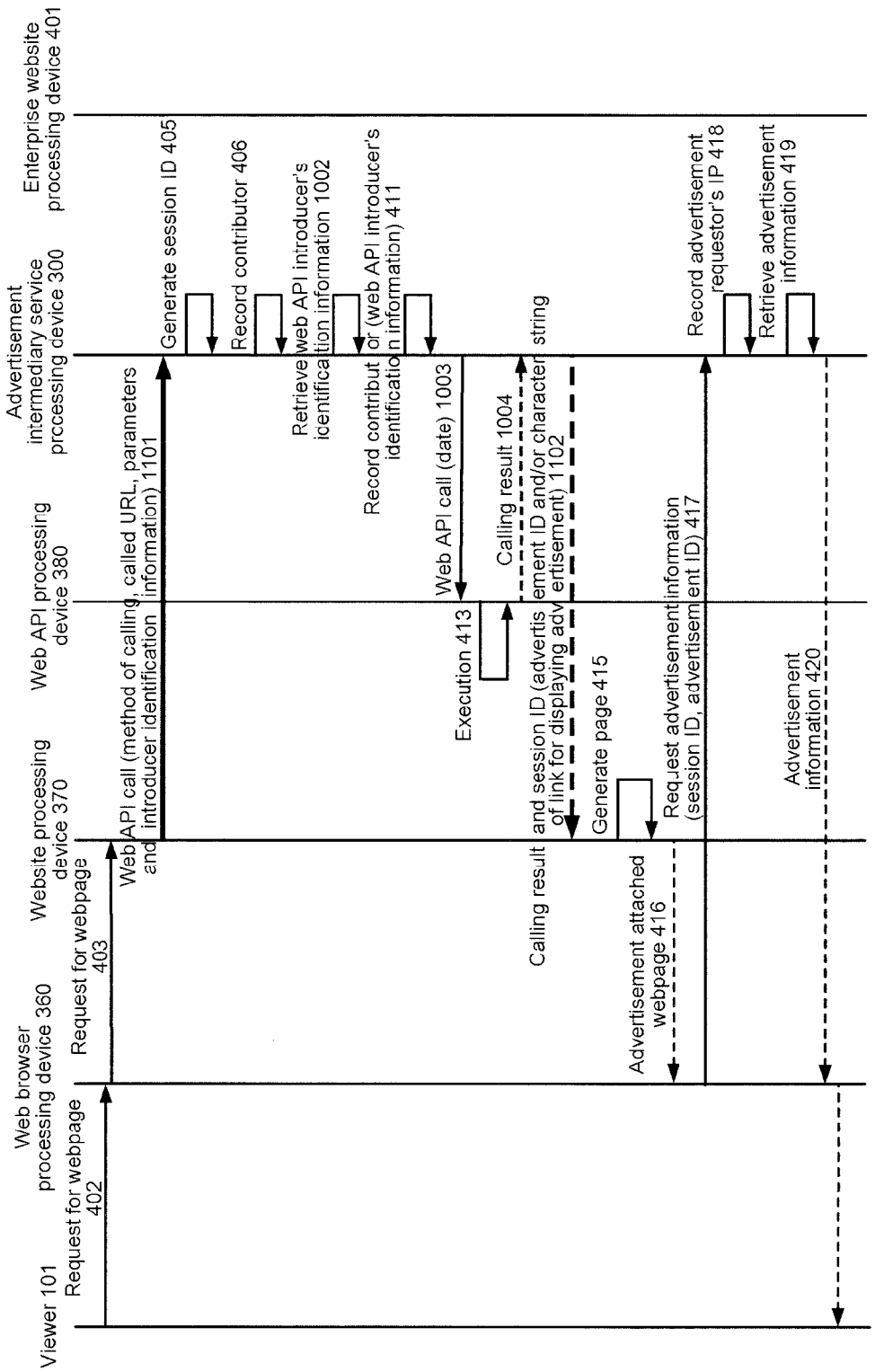
FIG. 10 is a sequence chart for a fourth embodiment.
Figure 11:
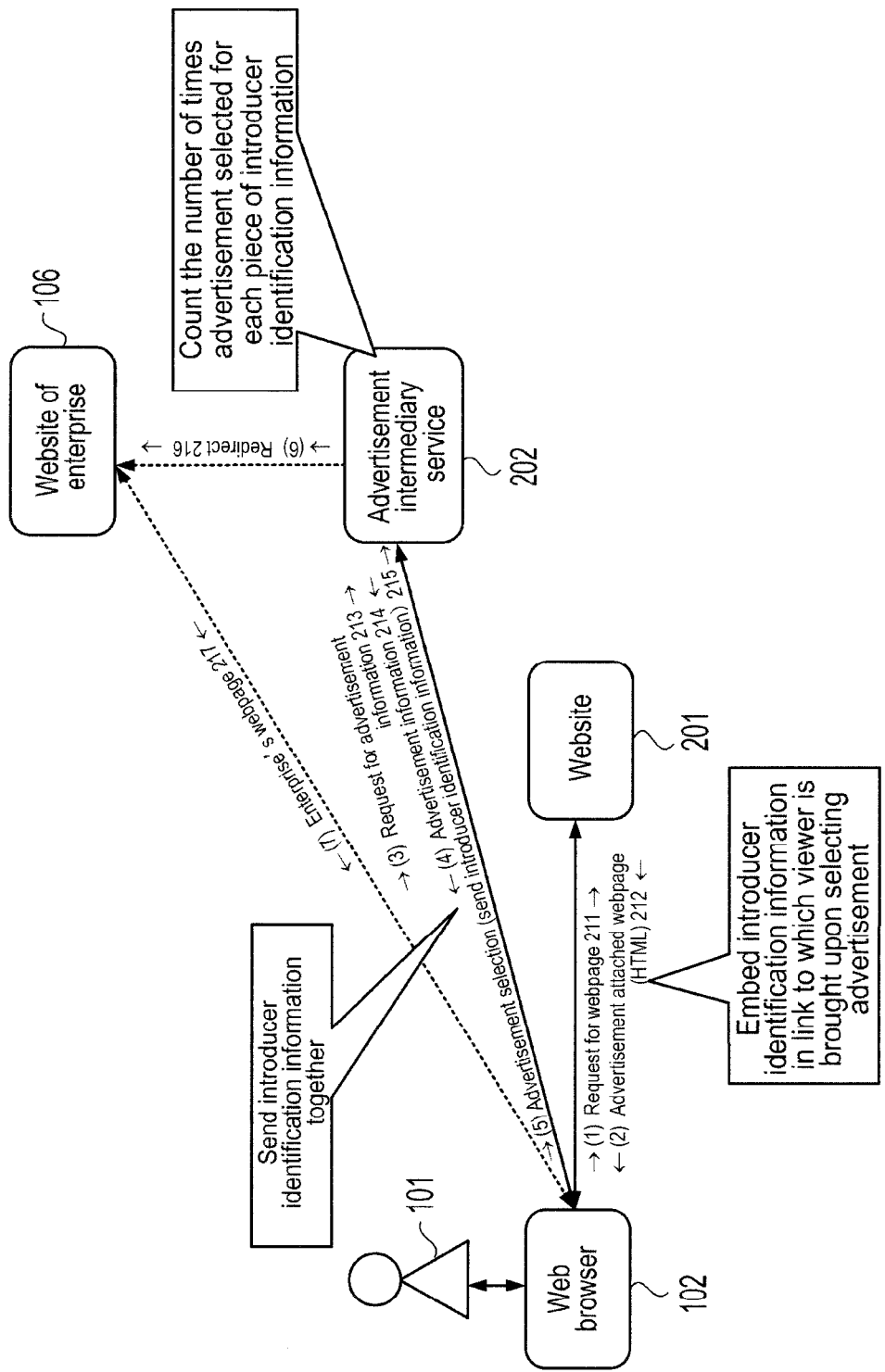
FIG. 11 conceptually illustrates conventional art.

A processing sequence is shown in FIG. 10. Differences from FIG. 9 are indicated by bold lines. The following description mainly focuses on the differences.

The system configuration of this embodiment is similar to the advertisement intermediary service processing device 900 of FIG. 8 except that the session ID confirming section 312 eliminated.

Having received the webpage request 403, the website processing device 370 first makes a web API call 1101. As arguments, a calling scheme, a called URL, parameters, and introducer identification information are passed. In FIG. 9, a session ID is passed as an argument instead of introducer identification information.

Upon receiving the web API call 1101, the advertisement intermediary service processing device 300 generates a session ID and performs contributor recording 406. The contributor recording 406 stores the combination of the introducer identification information passed in the arguments and the session ID in the contributor recording table 324.

Then, web API introducer identification information is retrieved 1002 and the web API introducer identification information is recorded by the contributor recording 411.

Upon a web API call 1003, the web API processing device retrieves a list of famous people whose birthday is the date passed in the arguments and returns the list as the calling result 1004.

With the result from the web API, the advertisement intermediary service processing device 300 returns the calling result and the session ID 1102 to the website. In addition to the calling result 1004 and the session ID, it may return an advertisement ID and/or a character string of a link for displaying the advertisement together.

The fourth embodiment has the following advantages. In the process shown in FIG. 10, a session ID and the result of a web API call can be obtained with one access to the advertisement intermediary service from the website processing device. Thus, frequency of communications performed across a network can be decreased.

In the first to third embodiments, a session ID can be first obtained and multiple web APIs can be called using the same session ID. In this case, it is necessary to implement processing for passing around the session ID. In the fourth embodiment, this processing for passing the session ID does not have to be performed if results of web API processing and an advertisement link are returned as a result of calling multiple web APIs. A need to call multiple web APIs can be addressed by posting an advertisement on each call. In this case, because a web API and an advertisement are in a one-to-one relationship, it is possible to display advertisements on a website limiting the types of advertisement to be output for each web API.

Fifth Embodiment

In the first embodiment, each time an advertisement revenue accrues from clicking of an advertisement or the like, web APIs that were utilized for creating the page on which the advertisement was clicked are identified and the advertisement revenue accrued is distributed.

The fifth embodiment describes a method for identifying the monthly usage of one or more web APIs called by a website and distributing the total referral fee obtained via the website among web API providers according to difference in usage of their web APIs.

For example, assume that a revenue for this month from an advertisement posted on website A is 5,000 yen and the website A has utilized web API α and web API β 6,000 and 4,000 times, respectively. As the numbers of times respectively represent 60% and 40% of the total number of calls, of 5,000 yen, 3,000 yen is paid to web API α and 2,000 yen to web API β. This is an example and paying a part of 5,000 yen to website A or the like is also possible.

Figure 12:
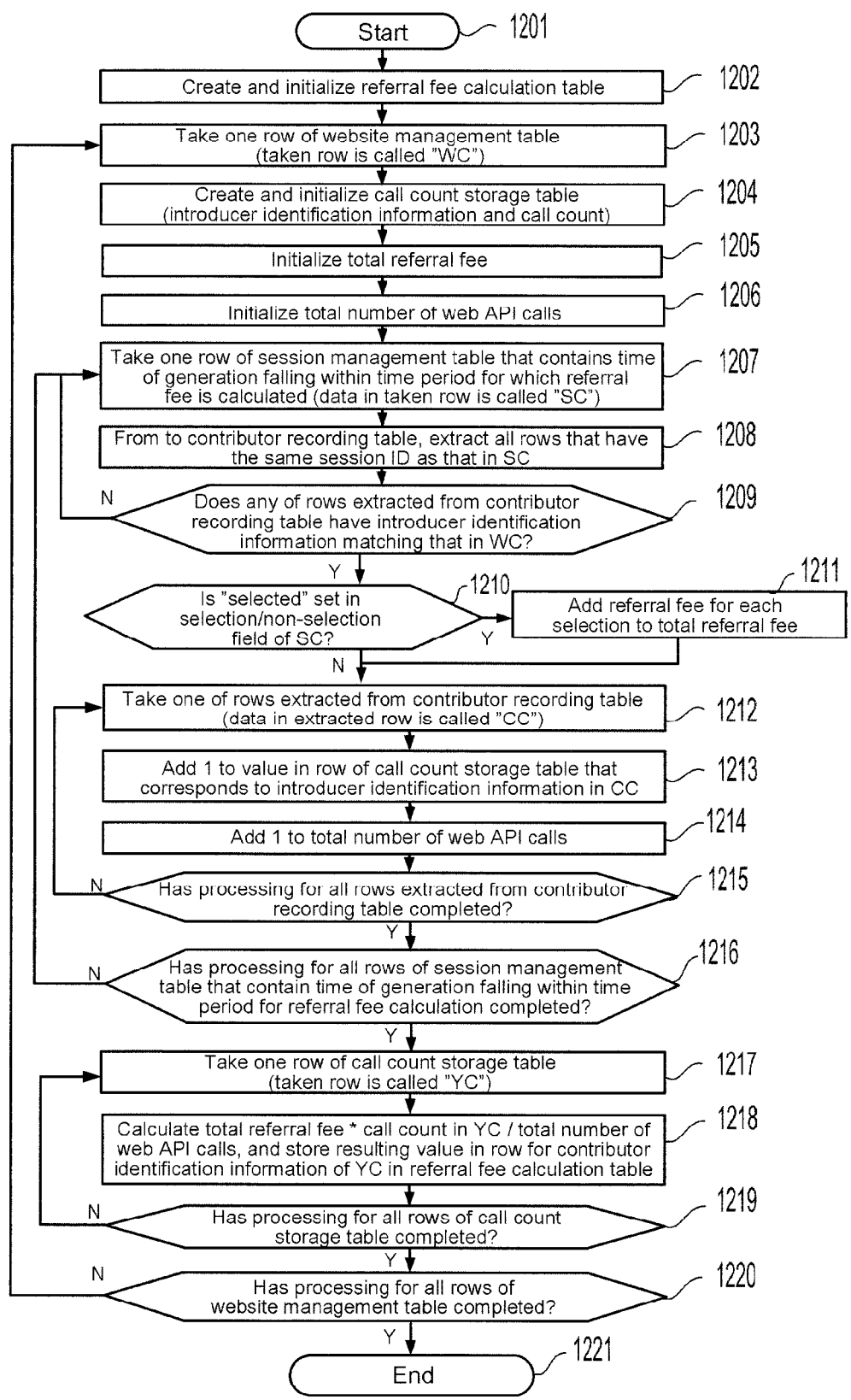
FIG. 12 is a flowchart of referral fee calculation in a fifth embodiment.

FIG. 12 shows a flowchart illustrating calculation of referral fee, which is applicable to the system configurations of FIGS. 2 and 8. While this process of referral fee calculation is intended for implementation by an advertisement providing service, such an embodiment is also possible that counts the number of times web APIs are called on the website processing device and calculating an advertisement revenue which a website will receive from the advertisement agent using this referral fee calculation process.

First, a referral fee calculation table is created and initialized 1202. The referral fee calculation table stores pairs of introducer identification information for individual web APIs and referral fees, and the initial value of referral fee is zero.

Next, one of the rows of the website management table is taken (the obtained row is called "WC") 1203.

A call count storage table (introducer identification information and the number of calls) is created and initialized 1204. The initial value of the number of calls is zero. Total referral fee is initialized 1205. The initial value of the total referral fee is zero. For the total referral fee, the sum of referral fees that have accrued through the website obtained at step 1203 is stored. The total number of web API calls is initialized 1206. Its initial value is zero. For the total number of web API calls, the number of calls for all the web APIs that have been called from the website obtained at step 1203 is stored.

One of rows of the session management table that contain time of generation falling within a time period for which a referral fee is calculated is taken (hereinafter, data in the row will be called "SC") 1208. From the contributor recording table, all rows that have the session ID in SC are extracted 1208. It is checked whether any of the rows extracted from the contributor recording table has introducer identification information matching that in WC 1209. If there is no such row, the flow returns to step 1208. If there is such a row, it is determined whether the selection/non-selection field in is set to "selected" 1210. If the field is "selected", a referral fee for one selection is added to the total referral fee 1211. Next, the rows extracted from the contributor recording table are taken one-by-one in order (data in the row is called "CC") 1212. One is added to the value in the row of the call count storage table that corresponds to the introducer identification information in CC 1213. One is added to the total number of web API calls 1214. It is checked whether processing for all the rows extracted from the contributor recording table is completed 1215. If not completed, the flow returns to step 1212. If processing for all the rows is completed, it is determined 1216 whether processing for all the rows of the session management table in which time of generation falls in the time period for referral fee calculation is completed. If not completed, the flow returns to step 1207. If completed, referral fees to be distributed to web APIs are determined.

The rows of the call count storage table are taken one-by-one in order (the rows are called YC) 1217. The total referral fee×the number of calls of YC/the total number of web API calls is calculated, and the resulting value is stored in the row of the referral fee calculation table corresponding to the contributor identification information in YC 1218. It is determined whether processing for all the rows of the call count storage table is completed 1219. If not completed, the flow returns to step 1217. If competed, it is checked whether processing for all the rows of the website management table is completed 1220. If not completed, the flow returns to step 1203 to perform similar processing for the next website.

Sixth Embodiment

Figure 13:
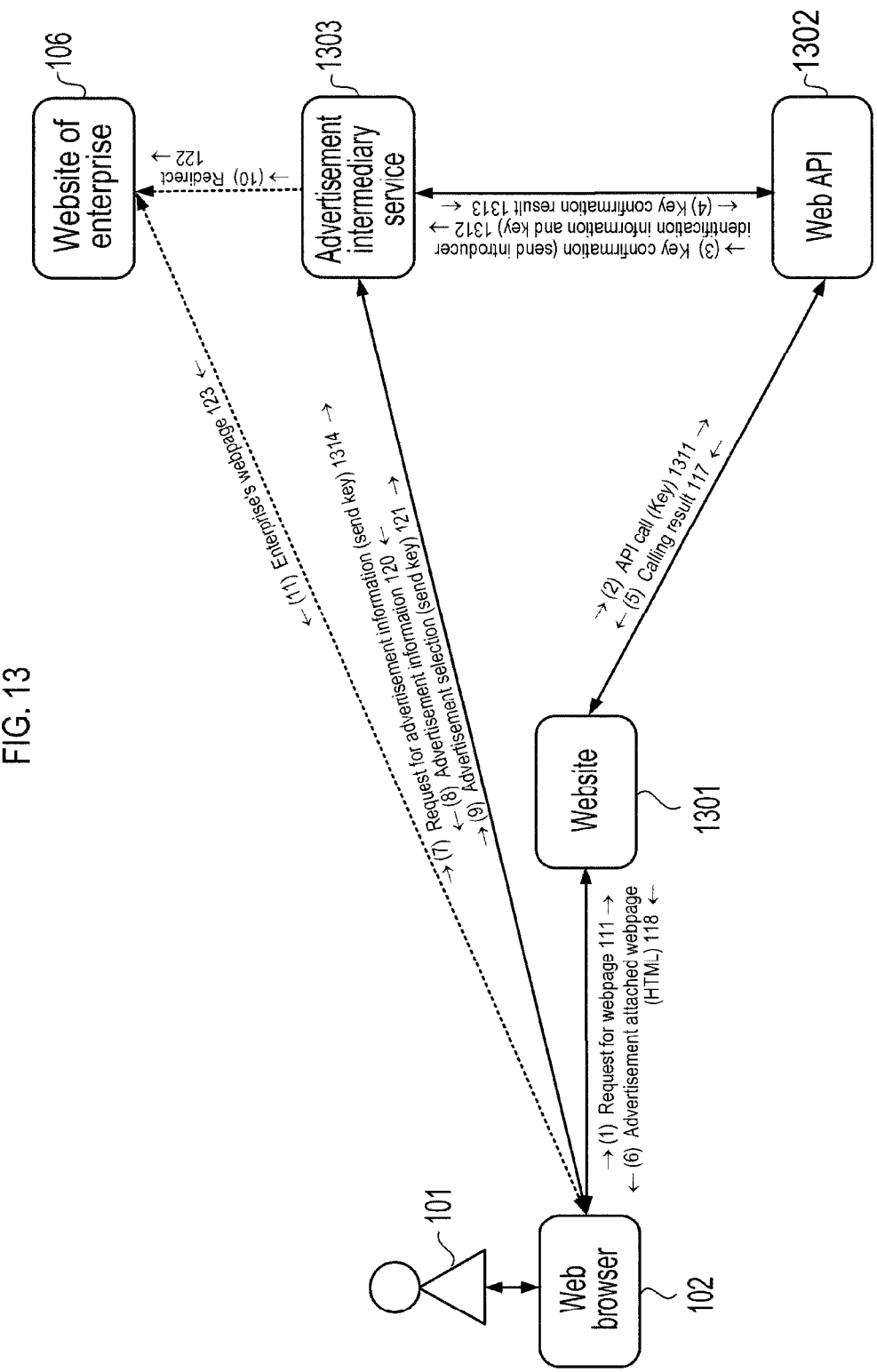
FIG. 13 conceptually illustrates a sixth embodiment.

The fifth embodiment showed a method of distributing a referral fee obtained via a certain website among web APIs utilized on the website in accordance with the ratio of their utilization. Although the fifth embodiment showed a referral fee distribution method applicable to the systems described in the first to fourth embodiments, distribution according to utilization ratio can be realized without using a session ID. The sixth embodiment shows a method for realization that does not utilize a session ID. FIG. 13 conceptually shows the embodiment.

Instead of a session ID, a key predefined for each website is used to identify a website 1301 that utilized the web API 1302. As the key, introducer identification information issued by the advertisement agent may be used.

Figure 14:
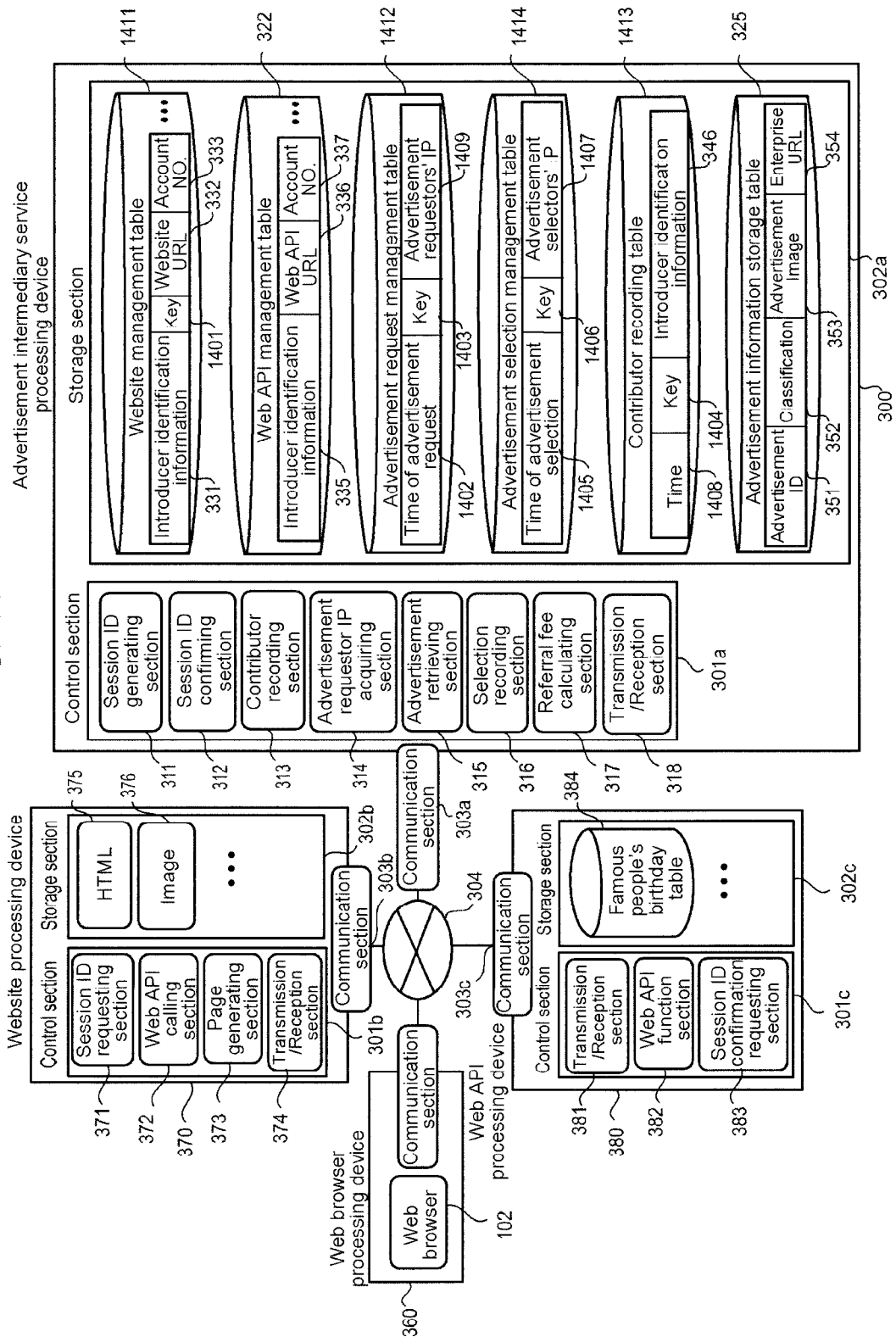
FIG. 14 shows a system configuration of the sixth embodiment.

System configuration is shown in FIG. 14, in which differences from FIG. 2 are indicated by bold lines. Key 1401 is added to the website management table 1411, time 1408 and key 1404 are added to the contributor recording table 1413, an advertisement request management table 1412 is added to enable management of advertisement request time 1402, key 1403, and advertisement requestor's IP 1409, and an advertisement selection management table 1414 is added to enable management of advertisement selection time 1405, key 1406, and advertisement selector's IP 1407. The session management table 323 is eliminated.

The flow will be described using FIG. 13. When the web browser 102 sends a webpage request 111 to the website 1301, the website 1301 makes an API call (key) 1311 to the web API 1302. The web API 1302 carries out key check (sends introducer identification information and a key) 1312 in order to verify that the key sent from the website 1301 is valid. The advertisement intermediary service 1303 checks whether the key is valid (whether the key is stored in the website management table 1411), and if the key is found to be valid, it stores the time 1408, key 1404, and introducer identification information 346 for the web API 1302 in the contributor recording table 1413. It then returns the result of key confirmation 1313 to the web API 1302.

If the key is valid, the web API 1302 executes processing of the web API and returns the calling result 117 to the website 1301. The website 1301 creates an advertisement attached webpage (HTML) 118 in which the calling result and HTML and the like for advertisement display are embedded, and returns the page to the web browser 102. The web browser 102 sends an advertisement information request (sending a key) 1314 to the advertisement intermediary service 1303 to acquire advertisement information. The advertisement intermediary service 1303 adds the advertisement request time 1402, key 1403, and advertisement requestor's IP 134 to the session management table 1412. And it retrieves appropriate advertisement information 120 from the advertisement information management table 325 and returns the information 120. The web browser 102 displays the advertisement information received.

When the viewer 101 selects the advertisement, advertisement selection (sending a key) 121 is sent to the advertisement intermediary service 1303. The advertisement intermediary service 1303 adds the advertisement selection time 1405, key 1406, and advertisement selector's IP 1407 to the advertisement selection management table 1414. The advertisement intermediary service 1303 then redirects the web browser 102 to the website of the enterprise 106. The website of the enterprise 106 returns the webpage of the enterprise 123 and the web browser 102 displays the webpage 123.

Figure 15:
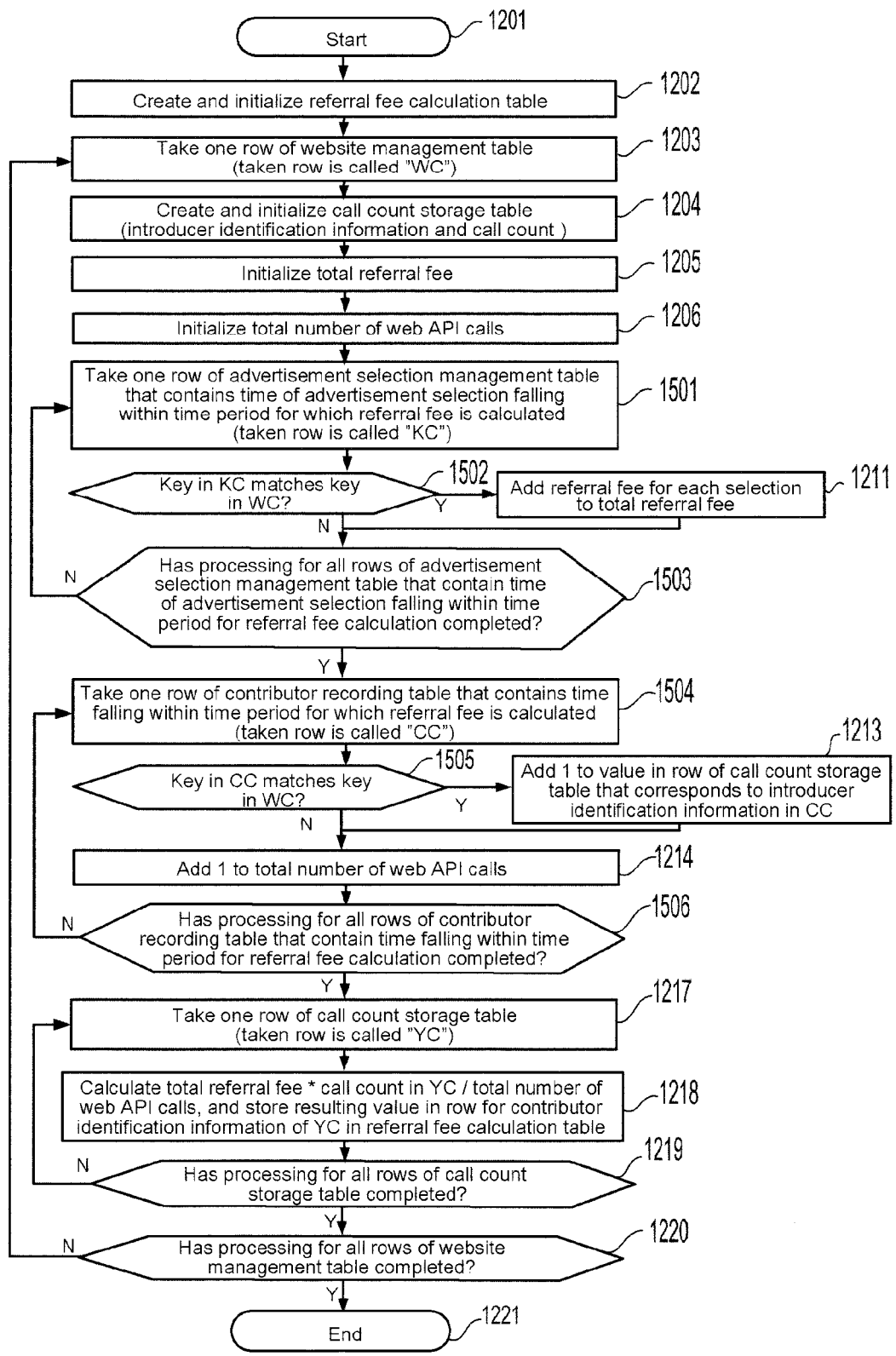
FIG. 15 is a flowchart of referral fee calculation in the sixth embodiment.

FIG. 15 shows a flowchart illustrating referral fee calculation in the present embodiment. It will be described mainly focusing on differences from FIG. 12.

Steps 1201 to 1206 are similar to FIG. 12.

Thereafter, the total referral fee is determined for each website that corresponds to WC retrieved at step 1203. The rows of the advertisement selection management table that have time of advertisement selection falling within a time period for which a referral fee should be calculated are taken one-by-one in order (the rows are called "KC") 1501. If the key in KC matches the key in WC 1502, a referral fee for one selection is added to the total referral fee 1211. It is checked 1503 whether processing is completed for all the rows of the advertisement selection management table that have a time of advertisement selection falling within the time period for referral fee calculation. If not completed, the flow returns to step 1501. If completed, calculation of total referral fee for websites corresponding to WC is finished.

Next, the number of calls for one or more web APIs that were utilized by the website corresponding to WC is calculated. The rows of the contributor recording table that have a time falling within a time period for which a referral fee should be calculated are taken one-by-one in order (the rows are called CC) 1504. If the key in CC matches the key in WC 1505, one is added to the value in the row of the call count storage table that corresponds to the introducer identification information in CC 1213. One is added to the total number of web API calls 1214. It is checked 1506 whether processing is completed for all the rows of the contributor recording table that have a time falling within the time period for referral fee calculation. If not completed, the flow returns to step 1504. If completed, steps 1217 through 1221, which are the same as in FIG. 12, are executed to calculate referral fees.

Because the present embodiment eliminates the necessity of the process to acquire a session ID from the advertisement intermediary service 105 and thus reduces frequency of communications, time required for processing requests from a web browser is expected to be shortened.

The method of the present embodiment utilizes a key each website already has, while the first to fifth embodiments use a session ID generated for each request. Thus, the sixth embodiment has the advantage of making it difficult to commit a fraud to maliciously perform key confirmation even if a web API is not called to pretend that the web API is frequently called.

Seventh Embodiment

An embodiment will be shown that sends usage of web APIs periodically, such as monthly, instead of notifying the advertisement intermediary service about usage every time a request is made.

Figure 16:
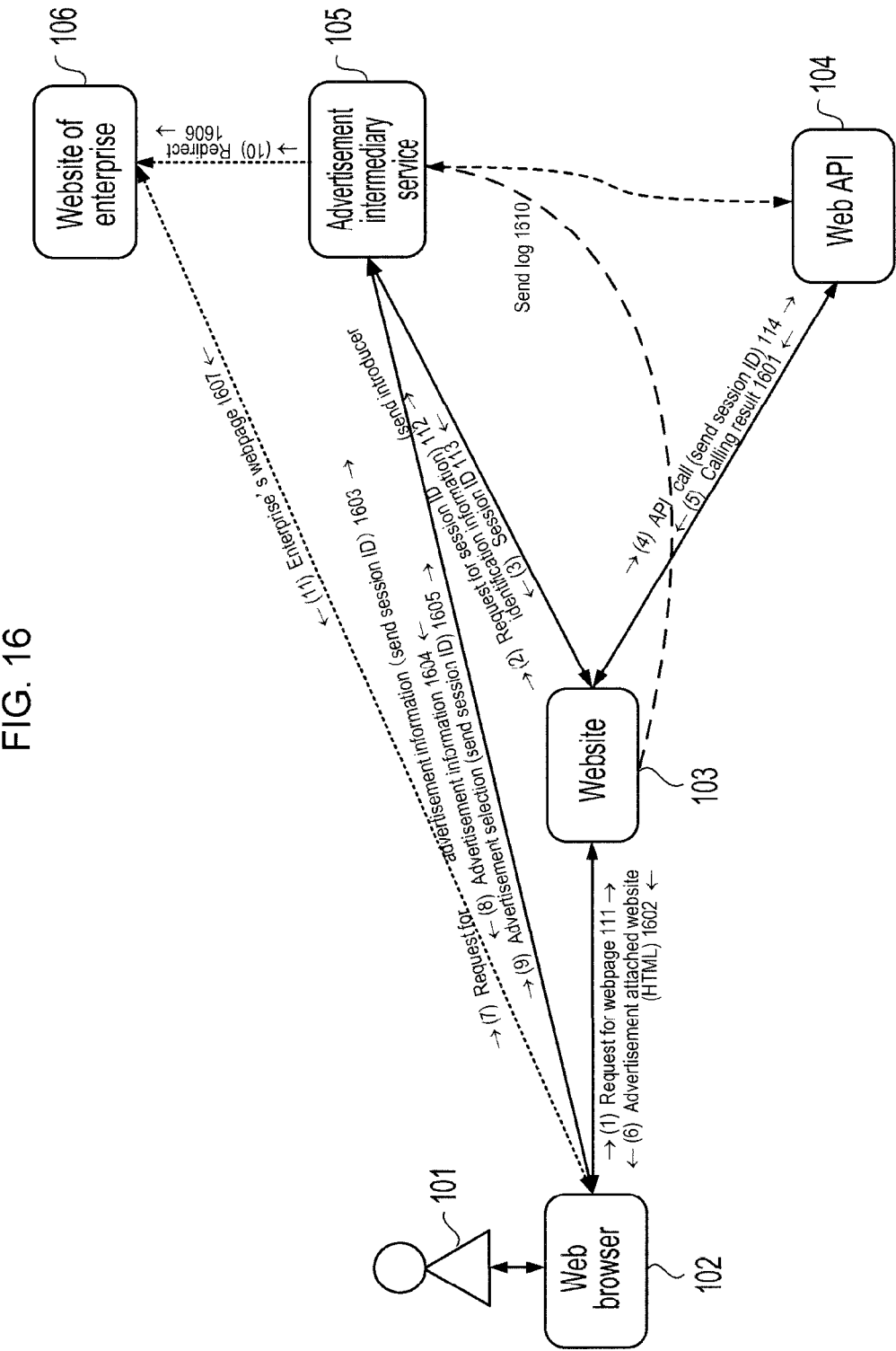
FIG. 16 conceptually illustrates a seventh embodiment.

The embodiment is conceptually illustrated in FIG. 16. In FIG. 1, the session ID confirmation 115 is requested and the result of session ID confirmation 116 is obtained from the advertisement intermediary service on each request, whereas in FIG. 16, the website 103 and the web API 104 periodically send logs 1610, and the advertisement intermediary service 105 summarizes the logs to identify web APIs that contributed.

Figure 17:
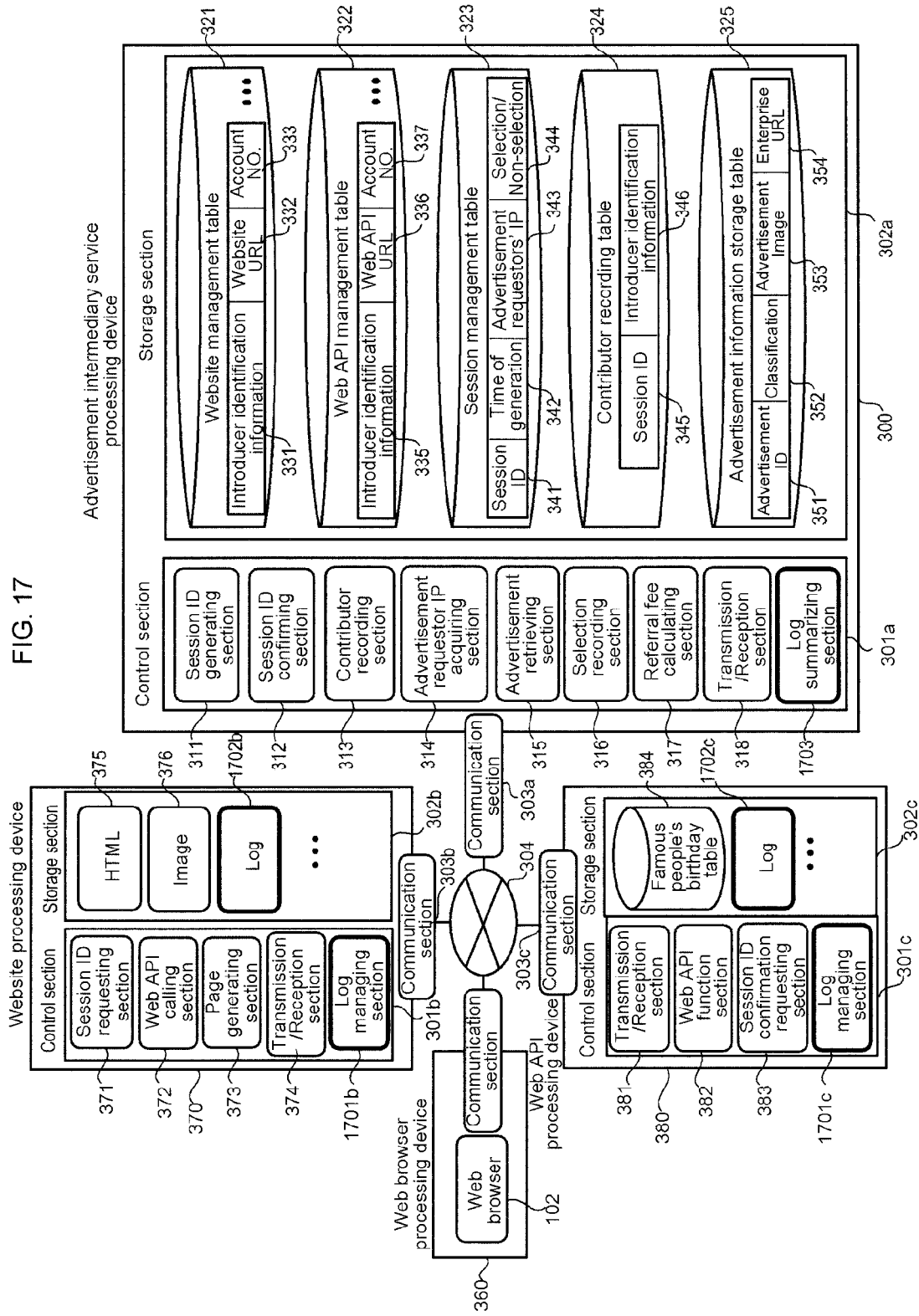
FIG. 17 shows a system configuration of the seventh embodiment.

A system configuration is shown in FIG. 17, where portions enclosed by a bold line are the additions of the present embodiment.

On the website processing device and the web API processing device, a log managing section 1701 is provided. The log managing section 1701b of the website processing device records calls to web APIs as log 1702b. The log managing section 1701c of the web API processing device records calls to web API as log 1702c.

An example of log 1702 is shown in FIG. 18. As a log 1801 for a website and a log 1802 for a web API, session IDs, time of call, calling introducer identification information, and called introducer identification information are recorded as logs.

The log 1702 is sent periodically (e.g., once a month) to the advertisement intermediary service processing device.

Logs may be sent by running a program such as a web server for receiving logs on the advertisement intermediary service processing device so that the website processing device and the web API processing device periodically send logs to the server, or running a server program such as a web server on the website processing device and the web API processing device so that the advertisement providing service periodically makes a log delivery request to the website processing device and web API processing device and the two devices send logs upon receiving the request.

Upon receiving the log 1702, the advertisement intermediary service processing device summarizes the log using a log summarizing section 1703.

Figure 19:
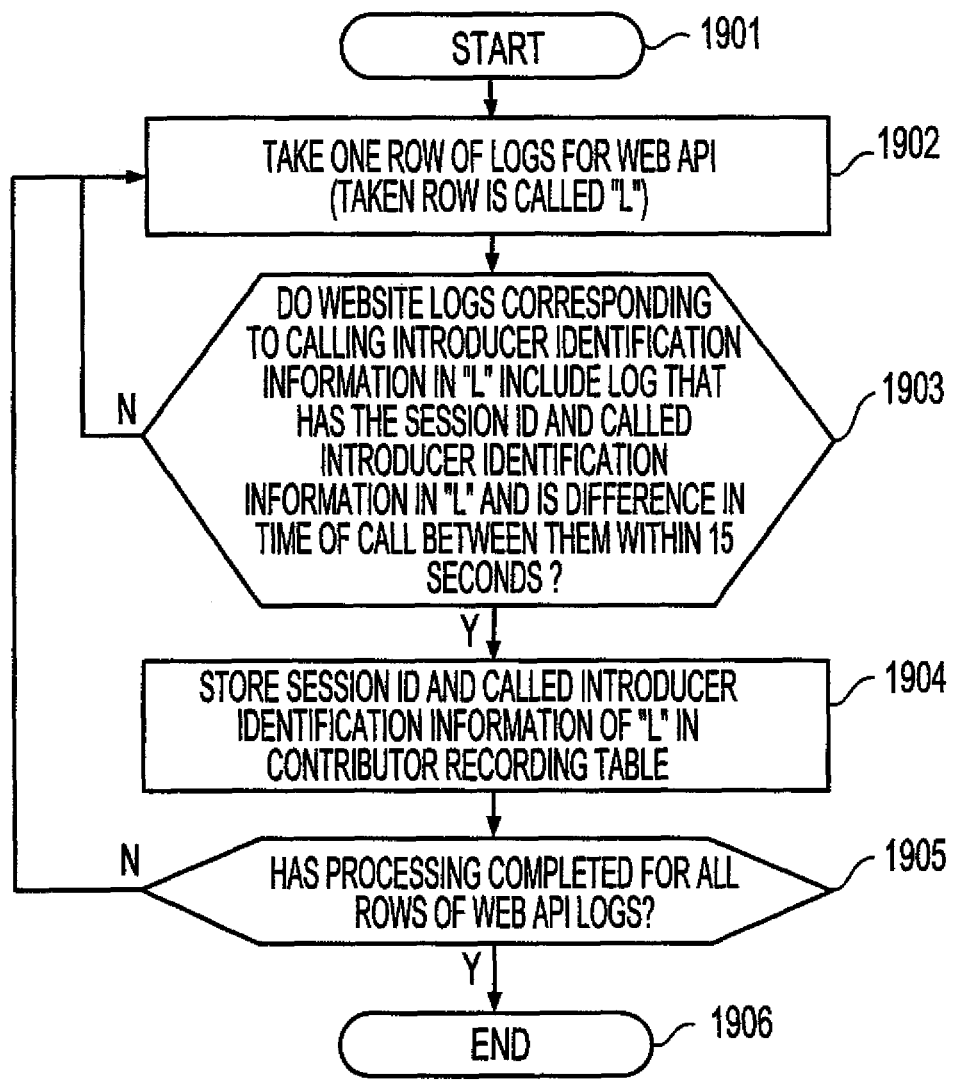
FIG. 19 is a flowchart for a log summarizing section of the seventh embodiment.

FIG. 19 shows a flowchart for the log summarizing section 1703. Here, the log summarizing section 1703 performs a task of extracting contents of logs and storing them in the contributor recording table 324. First, the rows of web API logs are taken one-by-one in order (the rows are called L) 1902. If website logs corresponding to the calling introducer identification information in L include a log that has the session ID and called introducer identification information in L and if the difference in time of call between them is not within 15 seconds 1903, the call might be fraudulent. Thus, the session ID and introducer identification information are not recorded to the contributor recording table 324, and the flow returns to step 1902. Before returning to step 1902, the introducer identification information that is possibly fraudulent may be recorded and utilized for warning the web API provider or website operator corresponding to the introducer identification information or stopping him utilizing the web API.

The 15 seconds at step 1903 is a rough guide of time required for a request to reach the callee from the caller, and if this value is exceeded, the call is invalidated because a fraudulent may have occurred. Of course, a value other than 15 seconds may be used or this check may not be performed.

If the session ID and introducer identification information are valid at step 1903, the session ID and called introducer identification information of L are stored in the contributor recording table 1904.

It is checked whether processing for all the rows of web API logs is completed 1905, and if not completed, the flow returns to step 1902. If completed, processing is terminated.

Since logs are collected from both the website processing device and the web API processing device in the present embodiment, a website and a web API have to collude to commit a fraudulent such as making a false report that the web API was used even if it was not actually utilized. The embodiment is thus expected to provide the effect of making fraudulent acts difficult. Of course, logs may be collected and summarized from only one of the website processing device or the web API processing device.

Also, while the present embodiment uses a session ID, a key may be used as in the sixth embodiment. In that case, a key of a web API is recorded in a log instead of a session ID. The key may be the same as the introducer identification information of the web API.

When a key is used, the storage section of the advertisement intermediary service of FIG. 17 will be similar to that of FIG. 14, and the process 1903 of storing the session ID and called introducer identification information of L in the contributor recording table which is performed by the log summarizing section of FIG. 19 is replaced with a process of recording the key and introducer identification information of L and the time of calling as the time.

Using the method of summarizing periodically-collected logs according to the present embodiment, performance is improved as compared to a method that checks session ID for each request. However, it also has a shortcoming in that it can find a fraud only at the time of log summarization.

Eighth Embodiment

A method for changing advertisements depending on the type of web API will be described.

Figure 20:
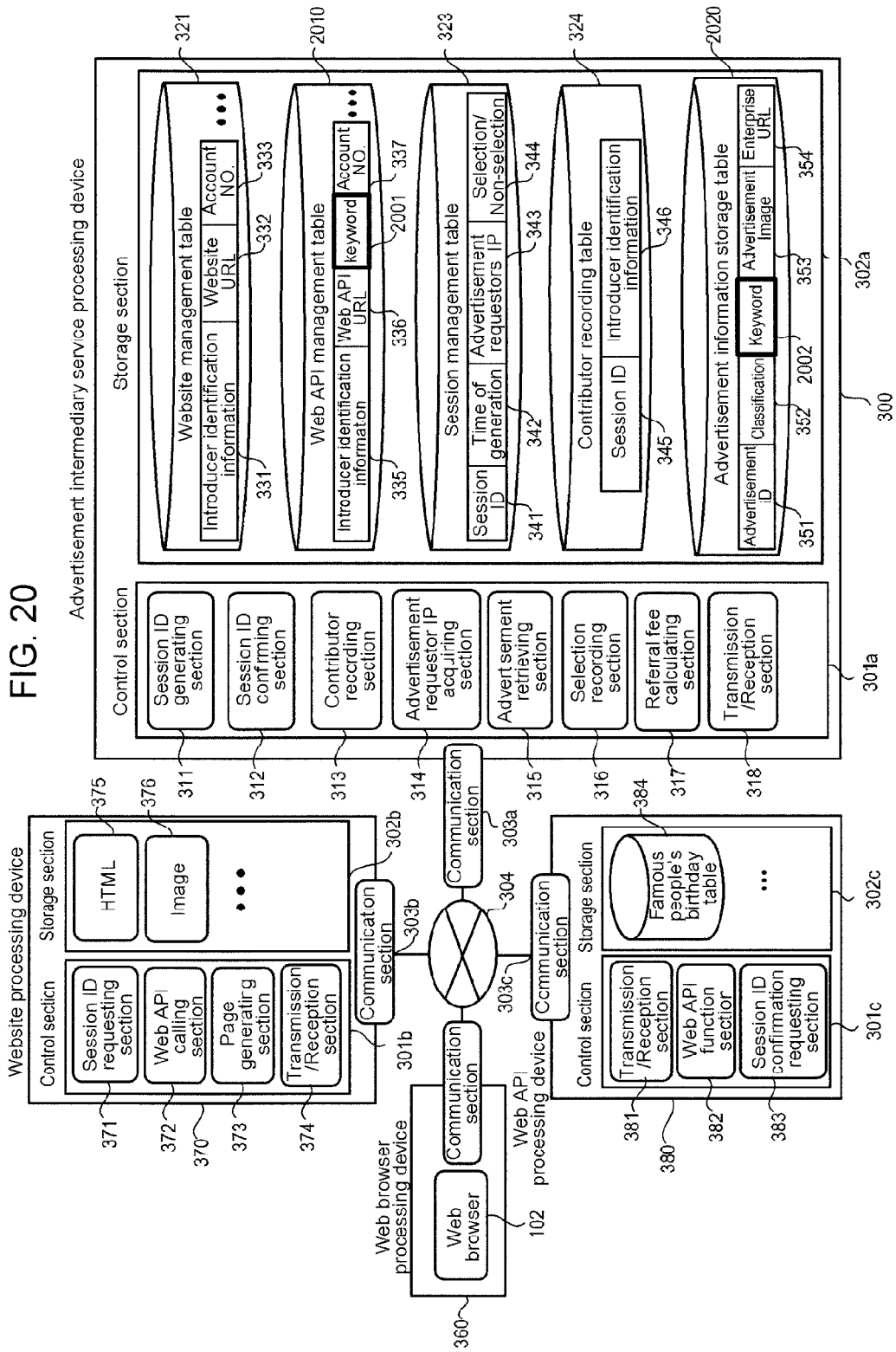
FIG. 20 shows a system configuration of an eighth embodiment.

Its system configuration is shown in FIG. 20, in which the portions enclosed by a bold line are the new additions. A keyword field 2001 is added to the web API management table 2010 and a keyword field 2002 is also added to the advertisement information storage table 2020. More than one keyword can be registered in each of the keywords fields.

In the keyword field 2001 of the web API management table 2010, keywords related to each web API are registered. For example, for a web API that indicates famous people's birthday, "famous people" and "birthday" can be registered as keywords.

In the keyword field 2002 of the advertisement information storage table 2020, keywords related to each advertisement are registered. For example, for an advertisement for a flower shop, "flower", "gift", and "birthday" can be registered as keywords.

For example, when the advertisement intermediary service 106 receives the advertisement information request (sending a session ID) 119 of FIG. 1, it finds rows containing the session ID corresponding with the received one from the contributor recording table 323, identifies introduced identification information 346 contained in the row, and extracts multiple keywords 2001 from a row the web API management table 2010 that contains the introducer identification information. Next, the advertisement intermediary service 106 searches for advertisements containing any of the keywords retrieved from the advertisement information storage table 2020 and returns rows it found to the web browser as advertisement information 120. When more than one row are found, one that contains the most matching keywords may be adopted or one may be randomly selected.

Although in the description above a process of finding an advertisement is performed on each request based on session ID, a field for registering web APIs to be utilized or web API keywords may be provided in the website management table so that web APIs that are utilized by a website or keywords for web APIs to be utilized may be registered in advance. This method is also applicable to an embodiment that uses keys or logs.

Ninth Embodiment

The foregoing embodiments summarize continuous usage of web APIs in the advertisement intermediary service. However, instead of continuous summarization, usage may be summarized only for a certain time period (e.g., only the first week of each month, every Wednesday, 10:00 to 12:00 every day, or at irregular intervals) so as to reduce burden of the task.

Using the concept of the invention, an opportunity to gain advertisement revenues can be given to web API providers who have had difficulty in gaining advertisement revenues. Also, a website operator has to deliberately judge whether a fee-based web API has an effect worth paying for it when he wants utilize a fee-based web API. A web API provided according to the present concept is easy to introduce as it only requires posting of an advertisement for utilizing it. As described above, the present concept is considered to have the effect of promoting utilization of web APIs or attracting more web API providers.

As has been described, the present invention involves three parties: web API provider, website operator, and advertisement agent. Advantages offered to the three parties by the invention are as follows.

Web API Provider

Many of web APIs are currently published as freeware. Using the present invention, a referral fee through an advertisement can be obtained from a website that utilizes a web API.

Website Operator

Enabled to easily create a sophisticated website utilizing web APIs. At present, some web APIs are utilized based on a contract, such as to pay a certain amount of yen per month or request, with a website operator who wants to utilize a web API. Using the present invention, which is a mechanism that allows a web API provider to gain a referral fee depending on the quantity of viewing for an advertisement posted on a website, a website operator can utilize web APIs just by posting an advertisement on his or her website.

The following are two possible ways to distribute a referral fee.

A website operator who wants to utilize a web API is required to post an advertisement in a manner specified by the provider of the web API and referral fees from that advertisement are paid only to the web API provider.

A website operator who wants to utilize a web API is required to post an advertisement in a manner specified by the provider of the web API and referral fees from that advertisement are paid to both the web API provider and the website operator.

In the latter case, if viewing of the website utilizing the web API increases and viewing of the advertisement concomitantly increases, more referral fees can be earned.

Advertisement Agent

An advertisement agent is a party that intervenes between an enterprise that wishes to run advertisement and a website operator who wants to gain advertising revenues by posting an advertisement on his website. The difference referral fees paid to the website operator and/or web API providers from the fee paid by the enterprise is the profit of the advertisement agent. As a fee paid by an enterprise wishing to run advertisement, a fee per viewing is set in many cases. As more websites carry sophisticated and appealing advertisements with use of web APIs, advertisements are more likely to be viewed. As a result, enterprises that want to run advertisements are expected to increase and it could in turn increase the profit of advertisement agents.

The invention claimed is:

1. An advertisement providing method, wherein the advertisement providing method is executed on a system including:
   a web browser processing device, on which a web browser is run,
   a website processing device, on which a website is run,
   a web API processing device, on which a web API is run, and
   an advertisement intermediary service processing device, on which an advertisement intermediary service is run,
      wherein the web browser processing device, the website processing device, the web API processing device, and the advertisement intermediary service processing device are interconnected by a network, the advertisement providing method comprising:
   providing a webpage on an Internet, by using a website stored in a non-transitory computer-readable medium, wherein the webpage uses one or more web Application Programming Interfaces (APIs);
   posting, on the webpage, an advertisement provided by an advertisement intermediary service;
   receiving, from a user, a user selection of an advertisement posted on the website;
   identifying a web API utilized by the website for creation of the webpage; and
   paying a consideration to a provider of the web API;
   performing, by using the website processing device, the following steps upon receiving a request for the webpage from the web browser:
   sending introducer identification information of an operator of the website to the advertisement intermediary service processing device,
   acquiring a session ID, and advertisement identification information from the advertisement intermediary service processing device, and
   calling the web API, including the session ID, in an argument;
   sending, from the web API processing device, the session ID and the introducer identification information of the web API provider, to the advertisement intermediary service processing device;
   verifying, by using the advertisement intermediary service processing device, whether or not the session ID is valid, and recording the session ID and the introducer identification information of the web API provider;
   executing the web API, by using the web API processing device, after the session ID is found to be valid on the advertisement intermediary service processing device, and sending a processing result from the web API processing device to the website processing device;
   generating a webpage, by using the website, the processing result, a URL of advertisement information possessed by the advertisement intermediary service, and the session ID, in order to generate a webpage in which the session ID is included as a parameter in the URL, in order to retrieve a resource of the advertisement information and return the webpage to the web browser; and
   requesting, by using the web browser, the resource of the advertisement information from the advertisement intermediary service processing device;
   recording, by using the advertisement intermediary service processing device, the request for the advertisement information in association with the session ID; and
   returning the resource of the advertisement information to the web browser; and
   displaying, by using the web browser the webpage generated by the website.

2. The advertisement providing method according to claim 1, further comprising:

selection, by a user, of an advertisement displayed on the web browser, sending, as a result of the selection, the advertisement identification information and the session ID to the advertisement intermediary service processing device, recording, by using the advertisement intermediary service processing device, the advertisement identification information and the session ID corresponding to the selection, and redirecting the web browser, by the advertisement intermediary service, to a website of an enterprise related to the advertisement identification information, in order to display a webpage corresponding to the advertisement.

3. The advertisement providing method according to claim 1, further comprising:

utilizing a session ID with which advertisement information recorded in the advertisement intermediary service processing device was requested; and extracting introducer identification information associated with the session ID, thereby identifying a website operator and a web API provider that contributed to generation of the webpage on which the advertisement is displayed.

4. The advertisement providing method according to claim 1, further comprising:

utilizing a session ID which was used in selection of an advertisement recorded in the advertisement intermediary service processing device; and extracting introducer identification information associated with the session ID, thereby identifying a website operator and a web API provider that contributed to generation of the webpage on which the advertisement has been selected.

5. The advertisement providing method according to claim 1, further comprising:

maintaining, by using at least one of the website and the web API, call logs for the web API with the session ID or a key; and regularly sending the logs to the advertisement intermediary service;

analyzing the logs, by using the advertisement intermediary service, to identify a web API utilized by the website.

6. The advertisement providing method according to claim 5, further comprising:

receiving, by using the advertisement intermediary service, a log from the website, and a log from the web API;

comparing, by using the advertisement intermediary service, contents of the log from the website with the log from the web API; and determining that a call is an authentic call when both the log from the website and the log from the web API include an indication that the website called the web API, or that the web API was called.

* * * * *